US010944776B2

(12) United States Patent
Bharrat et al.

(10) Patent No.: US 10,944,776 B2
(45) Date of Patent: Mar. 9, 2021

(54) KEY PERFORMANCE INDICATOR ANOMALY DETECTION IN TELEPHONY NETWORKS

(71) Applicant: Ribbon Communications Operating Company, Inc., Westford, MA (US)

(72) Inventors: Shaun Jaikarran Bharrat, Manalapan, NJ (US); Timothy R. Thornton, Brick, NJ (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

(21) Appl. No.: 16/817,488

(22) Filed: Mar. 12, 2020

(65) Prior Publication Data

US 2020/0213343 A1  Jul. 2, 2020

Related U.S. Application Data

(63) Continuation-in-part of application No. 16/283,600, filed on Feb. 22, 2019, and a continuation-in-part of
(Continued)

(51) Int. Cl.
*H04L 29/06* (2006.01)
*G06N 3/08* (2006.01)
(Continued)

(52) U.S. Cl.
CPC ....... *H04L 63/1425* (2013.01); *G06N 3/0454* (2013.01); *G06N 3/088* (2013.01); *G06Q 10/06393* (2013.01)

(58) Field of Classification Search
CPC .. H04L 63/1425; G06N 3/088; G06N 3/0454; G06Q 10/06393
(Continued)

(56) References Cited

U.S. PATENT DOCUMENTS 8,230,505 B1   7/2012  Ahrens et al.
2007/0121596 A1  5/2007  Kurapati et al.
(Continued)

OTHER PUBLICATIONS

Christopher Olah, "Understanding LSTM Networks", Aug. 27, 2015, 13 pages, posted on the Internet at http://colah.github.io/posts/2015-08-Understanding-LSTMs/.

*Primary Examiner* — Thjuan K Addy
(74) *Attorney, Agent, or Firm* — Straub & Straub; Stephen T. Straub; Michael P. Straub

(57) ABSTRACT

The present invention relates to communications methods and apparatus dynamically detecting and/or mitigating anomalies in communications systems/networks. An exemplary method of operating a system to detect traffic anomalies includes the steps of: inputting input values, said input values including i) a set of key performance indicator values and ii) one or more selector values corresponding to a first anomaly group classification instance into a trained neural network; operating the trained neural network to output values corresponding to the inputted set of key performance indicator values; determining a score for the first anomaly group classification instance based on the output values of the trained neural network corresponding to the key performance indicator values, each of said output values corresponding to one key performance indicator input value; and when the score is above a first threshold determining that an anomaly condition exists with respect to the first anomaly group classification instance.

22 Claims, 13 Drawing Sheets

Related U.S. Application Data application No. 16/057,114, filed on Aug. 7, 2018, now Pat. No. 10,659,485.

(60) Provisional application No. 62/817,511, filed on Mar. 12, 2019, provisional application No. 62/817,548, filed on Mar. 12, 2019, provisional application No. 62/703,848, filed on Jul. 26, 2018, provisional application No. 62/697,901, filed on Jul. 13, 2018.

(51) Int. Cl.
 *G06N 3/04* (2006.01)
 *G06Q 10/06* (2012.01)

(58) Field of Classification Search
 USPC ............ 379/210.02, 201.01, 201.02, 207.02, 379/266.08, 265.06, 265.03, 266.06, 379/266.1, 265.07
 See application file for complete search history.

(56) References Cited

U.S. PATENT DOCUMENTS

| | | |
|---|---|---|
| 2007/0165821 A1 | 7/2007 | Altberg et al. |
| 2009/0067410 A1 | 3/2009 | Sterman et al. |
| 2009/0103524 A1 | 4/2009 | Mantripragada et al. |
| 2009/0265778 A1 | 10/2009 | Wahl et al. |
| 2011/0149745 A1* | 6/2011 | Filho ................... H04L 63/1416 370/242 |
| 2012/0311659 A1 | 12/2012 | Narain et al. |
| 2014/0215621 A1 | 7/2014 | Xaypanya et al. |
| 2017/0289261 A1 | 10/2017 | Asveren |
| 2018/0007578 A1* | 1/2018 | Drabeck ............... H04L 43/062 |
| 2018/0198812 A1* | 7/2018 | Christodorescu ... H04L 63/1425 |
| 2020/0067831 A1 | 2/2020 | Spraggins et al. |
| 2020/0218983 A1 | 7/2020 | Thornton et al. |
| 2020/0218984 A1 | 7/2020 | Thornton et al. |

\* cited by examiner

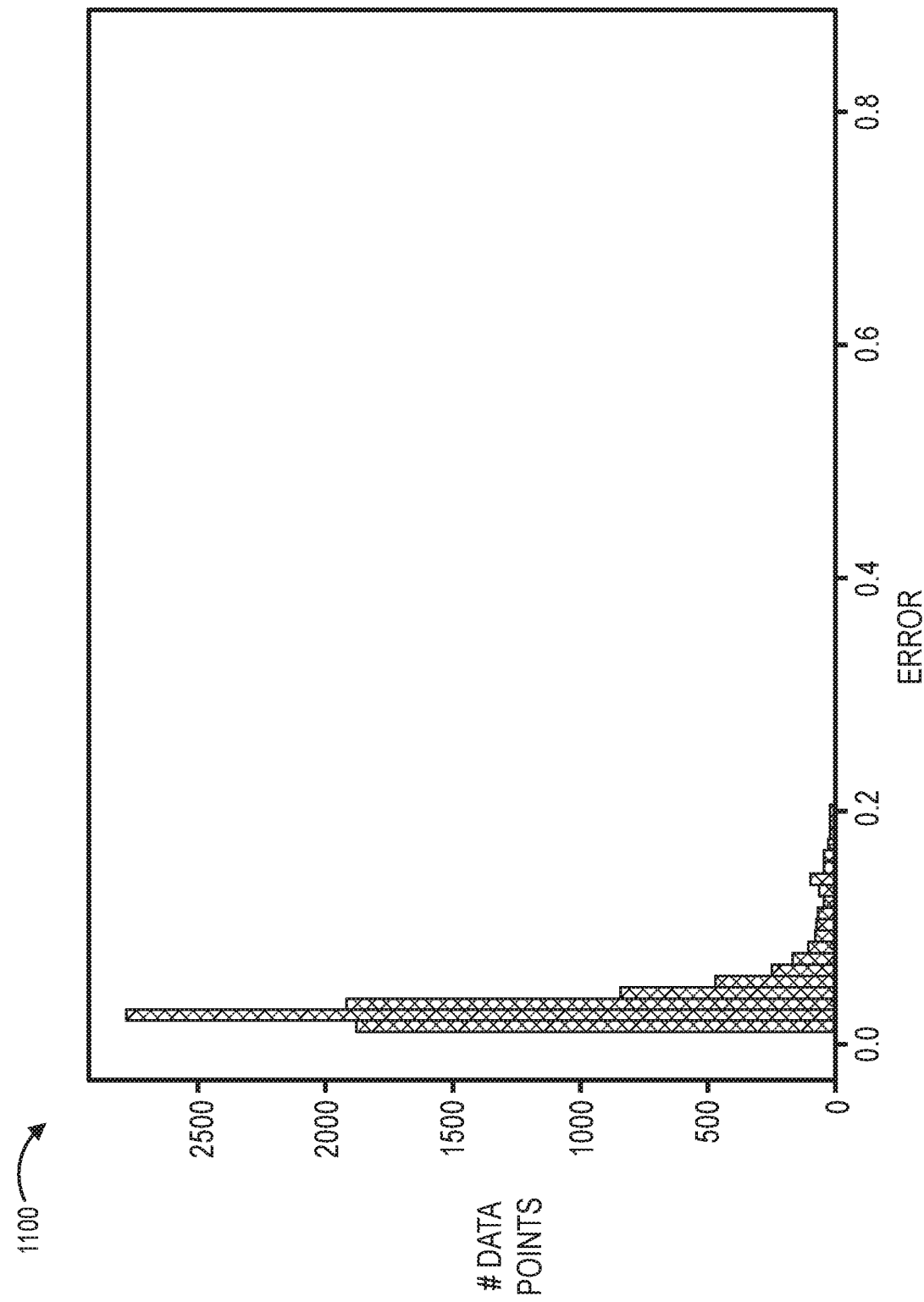

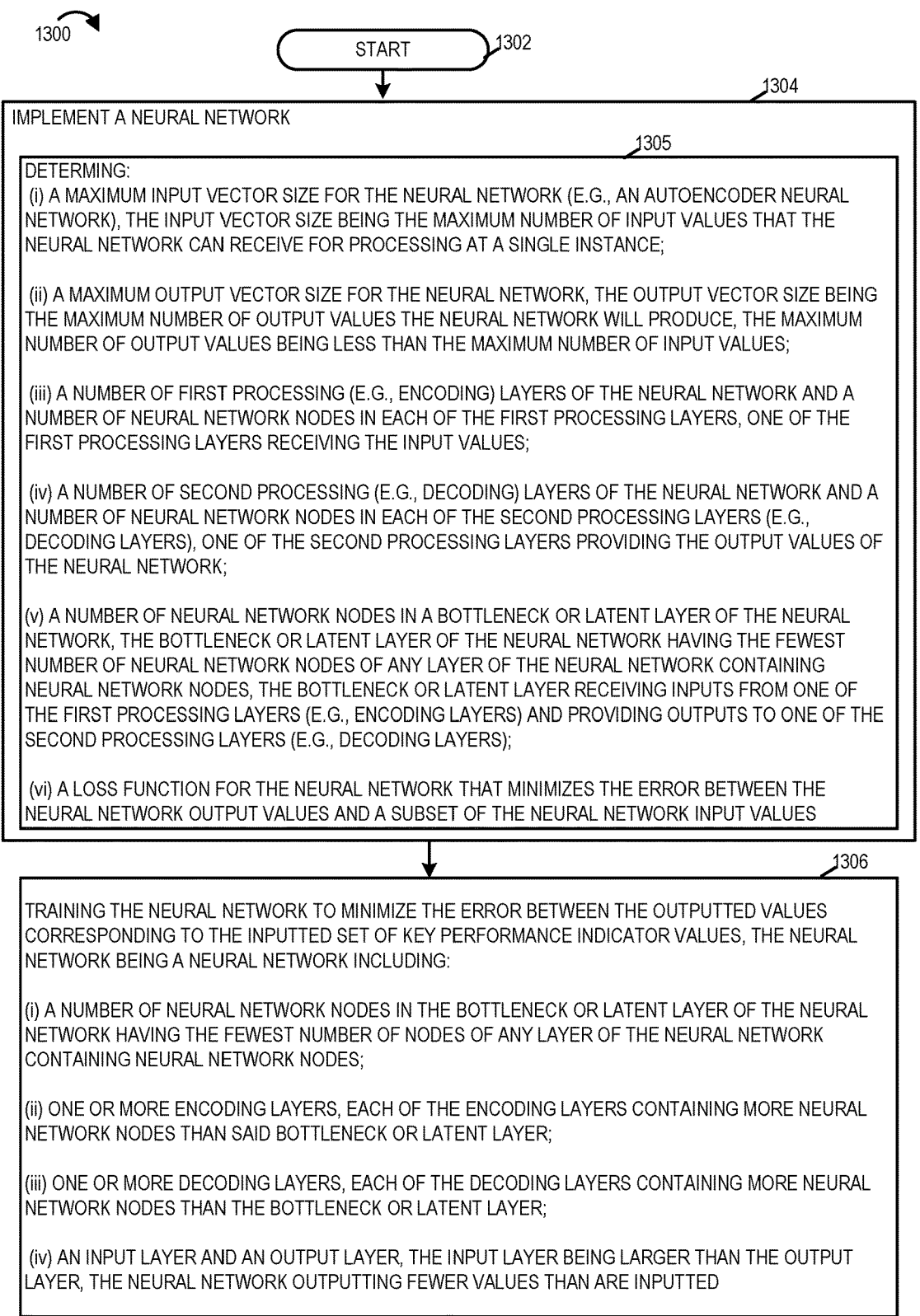
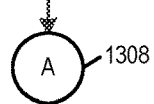
FIGURE 12A
FIGURE 12B
FIGURE 12
FIGURE 12A

KEY PERFORMANCE INDICATOR ANOMALY DETECTION IN TELEPHONY NETWORKS

RELATED APPLICATIONS

The present application claims the benefit of U.S. Provisional Patent Application Ser. No. 62/817,511 which was filed on Mar. 12, 2019 and which is hereby expressly incorporated by reference in its entirety. The present application claims the benefit of U.S. Provisional Patent Application Ser. No.: 62/817,548 which was filed on Mar. 12, 2019 and which is hereby expressly incorporated by reference in its entirety. The present application is also a continuation in part of U.S. patent application Ser. No. 16/057,114 filed on Aug. 7, 2018 published as U.S. Patent Application Publication No. US 2019-0173898 A1 on Jun. 6, 2019 which is a continuation in part of U.S. patent application Ser. No. 15/834,960 filed on Dec. 7, 2017 published as U.S. Patent Application Publication No. US 2019-0174000 A1 on Jun. 6, 2019, which claims the benefit of the filing date of U.S. Provisional Patent Application Ser. No. 62/595,311 filed on Dec. 6, 2017. U.S. patent application Ser. No. 16/057,114 also claims the benefit of the filing date of U.S. Provisional Patent Application Ser. No. 62/697,901 filed on Jul. 13, 2018 and U.S. Provisional Patent Application Ser. No. 62/703,848 filed on Jul. 26, 2018. The present application is also a continuation in part of U.S. patent application Ser. No. 16/283,600 filed on Feb. 22, 2019 published as U.S. Patent Application Publication No.: US 2020-0021609 A1 on Jan. 16, 2020 which is a continuation in part of U.S. patent application Ser. No. 16/057,114 which as previously noted also claims the benefit of the filing data of U.S. Provisional Patent Application Ser. No. 62/697,901 filed on Jul. 13, 2018 and U.S. Provisional Patent Application Ser. No. 62/703,848 filed on Jul. 26, 2018. Each of the proceeding patent applications and publications are hereby expressly incorporated by reference in their entirety.

FIELD OF INVENTION

The present invention relates to methods, systems, and apparatus for detecting and/or mitigating anomalous conditions in telephony networks based on Key Performance Indicators. The invention further relates to data-efficient multi-class Key Performance Indicator anomaly detection and/or mitigation in telephony networks.

BACKGROUND

A telephony network typically handles a wide variety of traffic, and a common problem in network management and security protection is detecting anomalies in network behavior relative to normal behavior. Complicating this problem is that the expected traffic patterns may vary widely by source, destination, subscriber, trunk groups, hour-of-day, day-of-week, and various other possible classification groups. Modeling the entire network and checking traffic against a global model is problematic since it requires either numerous small changes or a very large change to affect the overall network traffic. On the other hand, building separate models for each instance of interesting groupings results in an explosion of model instances, often resulting in overfitting due to insufficient data, overfitting being the production of an analysis that corresponds too closely or exactly to a particular set of data, and may therefore fail to fit additional data or predict future observations reliably.

The Traffic Sentry application suite of the Ribbon Protect system/platform offered by Ribbon Communications Inc. is a system that addresses this anomaly detection problem by building separate instance models along the relevant dimensions and it controls for the overfitting issue by using exponentially-weighted moving means and variance models (EMA/EMV) models with just two free parameters each. A system using this approach is described in U.S. patent application No. 16/057,114 filed Aug. 7, 2018 which is herein incorporated by reference in its entirety. Also incorporated by reference in their entirety are U.S. Provisional Patent Application Ser. No. 62/697,901 filed on Jul. 13, 2018, U.S. Provisional Patent Application Ser. No. 62/703, 848 filed on Jul. 26, 2018, and U.S. patent application Ser. No. 16/283,600 filed on Feb. 22, 2019. While this approach is superior to the traditional static thresholding approaches, there are still deficiencies in the quantity of diverse training data required, and in the inability to effectively correlate among intra-instance Key Performance Indicators (KPIs).

Exemplary Key Performance Indicators for a telephony network include Egress BIDs, Egress STOPs, Egress MOU, Ingress BIDs, Ingress STOPs, Ingress MOU, BIDs, STOPs, and MOU. Egress BIDs is the number of calls a monitored subscriber made in a given interval. Egress STOPs is the number of completed/connected calls made by a monitored subscriber in a given interval. Egress MOU is the Minutes Of Usage from connected calls made by a monitored subscriber in a given interval. Ingress BIDs is the number of calls a monitored subscriber received in a given interval. Ingress STOPs is the number of completed/connected calls a monitored subscriber received in a given interval. Ingress MOU is the Minutes Of Usage from connected calls received by a monitored subscriber in a given interval. BIDs is the number of calls a monitored subscribe made or received in a given interval. STOPs is the number of completed/connected calls a monitored subscriber made or received in a given interval. MOU is the Minutes of Usage from connected calls made or received by a monitored subscriber in a given interval. Key Performance Indicator values can be determined by monitoring network traffic and/or analyzing call detail records. A call detail record (CDR) is a data record produced by a telecommunications device, e.g., Session Border Controller, that documents the details of a telephone call or other telecommunications transaction (e.g., video session) that passes through the device.

Under the aforementioned approach, a first issue is that separate model instantiations are used for each instance of a group in order to capture the specifics of that particular instance. For example, the traffic characteristic on trunk group A may be significantly different than trunk group B. The downside of this is that significant data is required for each trunk group for every model instance to be sufficiently trained. In practice, it has been observed that this can lead to a non-negligible percentage of the model instances being undertrained, and unable to do effective anomaly detection, for a significant period after startup. Furthermore, while behavior among different trunk groups can be significantly different, it is often not. What is desirable here is a scheme wherein trunks that are not significantly different to effectively logically share a model instance, and trunks that are markedly different to use separate model instances.

The second issue with the above described approach is also related to the data availability problem. In some implementations, separate models are kept for different time periods, e.g., "working-hours" versus "non-working-hours." The underlying reason is that given the nature of the telephony application, traffic can be significantly different at different times of the day, or days of the week. Unfortunately, this binary break-down is not sufficient in practice and feedback from customers using such systems have indicated a desire for further stratification and even for stratification down to every hour of every day. This is impractical because that now requires sufficient training data not just per instance, but per instance and per hour/day of the week. And while traffic patterns can be different on an hour-by-hour basis, there is high correlation between adjacent hours. As before, what is needed here is for a different model to be used for cases where the traffic is different hour-by-hour but using a shared model across the hours that do not exhibit this disparity.

The third issue with the current implementation is that separate, and independent, models are created for each KPI of each group instance. Specifically, there are separate models for ingress bids, egress bids, ingress connects, egress connects, ingress MOU, egress MOU, etc. This allows for the detection of anomalies in any of the KPIs. However, the current system does not support anomaly detection where it is the combination of KPIs that is anomalous. For example, a particular low value of ingress bids and a high ingress MOU may both be within range independently, but the combination could be problematic as it signals a much larger than normal average call duration. A more complete anomaly model would also capture the expected relationships among the KPI values.

From the foregoing it is apparent that there is a need for a technological solution to how to effectively, efficiently and in a cost-efficient manner, detect and/or mitigate traffic anomalies in networks that solves one, some, or all of the aforementioned problems.

SUMMARY

The present invention relates to methods, systems, and apparatus for detecting and/or mitigating anomalous conditions in telephony networks based on Key Performance Indicators. The invention further relates to data-efficient multi-class Key Performance Indicator anomaly detection in telephony networks. Various embodiments of the present invention address and solve one or more of the technological problems discussed above.

An exemplary method embodiment of operating a system to detect traffic anomalies, e.g. in communications network such as a telephony network, includes the steps of: inputting or receiving input values, said input values including i) a set of key performance indicator values and ii) one or more selector values corresponding to a first anomaly group classification instance into a trained neural network; operating the trained neural network to output values corresponding to the inputted set of key performance indicator values; determining a score for the first anomaly group classification instance based on the output values of the trained neural network corresponding to the key performance indicator values, each of the output values corresponding to one key performance indicator input value; comparing the score to a first threshold; and when said score is above a first threshold determining that an anomaly condition exists with respect to the first anomaly group classification instance. In some embodiments, when said score is at or below said first threshold the method further includes the step of determining that an anomaly condition does not exist with respect to the first anomaly group classification instance.

In some embodiments, the neural network is an autoencoder neural network.

In some embodiments, the step of determining a score for the first anomaly group classification instance based on the output values of the trained autoencoder neural network includes determining a loss function value which measures the difference between the inputted key performance indicator values and the corresponding autoencoder neural network values.

In some embodiments, the score for the anomaly group classification instance is the determined loss function value. The loss function value may be, and in some embodiment is, a reproduction error of the neural network post-image output (i.e., output values corresponding to the inputted key performance indicator values) indicating an amount of discrepancy between a subset of the input values and corresponding autoencoder neural network output values, said subset of the input values being smaller than the set of input values. Typically, the subset of the input values includes the key performance indicator values and does not include the one or more selector input values. In most embodiments, the subset of the input values does not include any of the selector values.

In some embodiments, the loss function value is determined using a non-standard cross-entropy loss function.

In some embodiments, the loss function is a non-standard loss function which does not consider the reproduction error relative to the entire set of input values but considers less than the entire set of input values or a sub-set of the input values.

In some embodiments, the first anomaly group classification instance is a trunk group during a specified time period; and the key performance indicator values are traffic performance measurements (or metrics) corresponding to the trunk group during the specified time period.

In some embodiments, the first anomaly group classification instance is a two dimensional group classification, the first dimension group classification being a trunk group and the second dimension group classification being a time group, the trunk group specifying the identity of the trunk group from a plurality of trunk groups (e.g., trunk group 1) and the time group specifying time period or interval (e.g., time group such as Day of week/hour of day); and the key performance indicator values are traffic performance measurements (or metrics) for the identified trunk group (e.g., trunk group ID) during the time period specified by the time group (e.g, day of week/hour of day).

In some embodiments, the key performance indicators include two or more of the following: ingress and egress bids, ingress and egress connections, ingress and egress minutes of usage (MOU), number of bids, connects and MOU independent of direction.

In some embodiments, the first anomaly group classification instance is a two dimensional group classification, the first dimension group classification being one of the following group types: source, destination, subscriber, or trunk group and the second dimension group classification being a time group, the first anomaly group classification specifying the identity of the instance's group type from a plurality of such instances (e.g., source ID, destination ID, subscriber ID or trunk group ID) and the time group specifying time period or interval (e.g., time group (day of week/hour of day)); and the key performance indicator values are traffic performance measurements (or metrics) for the identified group classification instance (e.g., source ID, destination ID, subscriber ID or trunk group ID) during the time period specified by the time group (e.g., day of week/ hour of day).

In some embodiments, the first anomaly group classification instance is an N-dimensional group classification, N being a positive integer value greater than one, the N-dimensional group classification including two or more of the following: source, destination, subscriber, trunk group, and time group.

In another exemplary method embodiment, the method includes the steps of: inputting input values, said input values including i) a set of key performance indicator values and ii) one or more selector values corresponding to a first anomaly group classification instance into a trained neural network; operating the trained neural network to output values corresponding to a subset of the inputted values; determining a score for the first anomaly group classification instance based on one or more of the output values of the trained neural network, said one or more output values corresponding to one or more of the key performance indicator values included in the set of key performance indicator values; comparing the score to a first threshold; and when said score is above a first threshold determining that an anomaly condition exists with respect to the first anomaly group classification instance.

In some embodiments, the trained neural network includes: an input layer for receiving the input values; an output layer which contains the computed output values, said output layer being smaller than said input layer; at least three neural network layers including neural network nodes, said at least three neural network layers including neural network nodes including a first neural network processing layer, a second neural network processing layer, and a bottleneck layer, said bottleneck layer having the fewest nodes of any neural network layer of the neural network containing neural network nodes, said bottleneck layer receiving inputs from said first processing neural network layer and providing outputs to said second neural network layer; the neural network having been trained to minimize the error between the output values and a subset of the input values.

In some embodiments, the neural network is trained with a training dataset of unlabeled Key Performance Indicator data. In some embodiments, the unlabeled Key Performance Indicator training data of the training dataset does not include an indication of which Key Performance Indicator training data is good and which is bad. In some embodiments, an amount of the Key Performance Indicator training data above a first threshold (e.g., 95%) represents normal expected Key Performance Indicator sample values. In some embodiments, the first threshold is 95% of the total amount of training data in the training set.

In some embodiments, the one or more of the inputted selector values do not produce any change in the output values (i.e., some values of the selector variables are ignored by the trained neural network).

In some embodiments, the input and output values are numerical values (e.g., floating point values between 0 and 1 or between −1 and 1).

In some embodiments, in response to determining that an anomaly condition exists with respect to the first anomaly group classification instance sending a notification of the detection of the anomaly condition, e.g., via a wired or wireless message to an incident detection system and/or a network or system operator. In some embodiments, a mitigation action is taken in response to detection of the anomaly condition in addition to or in place of the notification message upon detection of the anomaly condition.

When said score is at or below said first threshold, the method may and usually does include the step of: determining that an anomaly condition does not exist with respect to the first anomaly group classification instance.

The invention is also directed to systems and apparatus that are used to implement the various method embodiments of the invention. In some apparatus embodiments the each of the apparatus/nodes/devices of the system include a processor and a memory, the memory including instructions when executed by the processor control the apparatus/node/device of the system to operate to perform the steps of various method embodiments of the invention.

An exemplary system to detect traffic anomalies in accordance with an embodiment of the invention includes: a trained neural network; and a processor, said processor being configured to control the operations of the system to: input (e.g., load) into the trained neural network input values, said input values including: i) a set of key performance indicator values and ii) one or more selector values corresponding to a first anomaly group classification instance (e.g., 2 selector inputs—trunk group ID, time-group); operate the trained neural network to output values corresponding to the inputted set of key performance indicator values; determine a score for the first anomaly group classification instance based on the output values of the trained neural network corresponding to the key performance indicator values, each of said output values corresponding to one key performance indicator input value; compare the score to a first threshold; and when said score is above a first threshold determining that an anomaly condition exists with respect to the first anomaly group classification instance.

In some embodiments, the trained neural network is an autoencoder neural network trained to minimize the error between the outputted values corresponding to the inputted set of key performance indicator values, the autoencoder neural network being a neural network including: i) a number of neural network nodes in a bottleneck layer of the neural network, said bottleneck layer of the neural network having the fewest number of nodes of any layer of the neural network containing neural network nodes; ii) one or more encoding layers, each of said encoding layers containing more neural network nodes than said bottleneck layer; and (iii) one or more decoding layers, each of said decoding layers containing more neural network nodes than said bottleneck layer.

In some embodiments, the autoencoder neural network has an input layer and an output layer, the input layer being larger than said output layer, the autoencoder neural network outputting fewer values than are inputted.

In some embodiments, the neural network includes: an input layer which receives the input values; an output layer from which the neural network output values are outputted; a bottleneck layer including a plurality of neural network nodes, said bottleneck layer having the fewest neural network nodes of any layer in the neural network containing neural network nodes, said bottleneck layer receiving inputs from a first neural network layer containing more neural network nodes than said bottleneck layer, said bottleneck layer providing outputs to a second neural network layer containing more neural network nodes than said bottleneck layer; and the neural network minimizes the error between the neural network output values and a subset of the input values.

In some embodiments, the processor further controls the operation of the system prior to training the neural network to configure the neural network to have: (i) a maximum input vector size for the neural network, said input vector size being the maximum number of input values that the neural network can receive for processing at a single instance; (ii) a maximum output vector size for the neural network, said output vector size being the maximum number of output values the neural network will produce, said maximum number of output values being less than said maximum number of input values; (iii) a number of first processing (e.g., encoding) layers of the neural network and a number of neural network nodes in each of said first processing layers, one of said first processing layers receiving said input values; (iv) a number of second processing (e.g., decoding) layers of the neural network and a number of neural network nodes in each of said second processing layers (e.g., decoding layers), one of said second processing layers providing said output values of the neural network; (v) a number of neural network nodes in a bottleneck layer of the neural network, said bottleneck layer of the neural network having the fewest number of neural network nodes of any layer of the neural network containing neural network nodes, said bottleneck layer receiving inputs from one of said first processing layers (e.g., encoding layers) and providing outputs to one of said second processing layers (e.g., decoding layers); (vi) a loss function for the neural network that minimizes the error between the neural network output values and a subset of the neural network input values.

In some embodiments, the operation to configure the neural network includes determining for the neural network: (i) a maximum input vector size for the neural network, said input vector size being the maximum number of input values that the neural network can receive for processing at a single instance; (ii) a maximum output vector size for the neural network, said output vector size being the maximum number of output values the neural network will produce, said maximum number of output values being less than said maximum number of input values; (iii) a number of first processing (e.g., encoding) layers of the neural network and a number of neural network nodes in each of said first processing layers, one of said first processing layers receiving said input values; (iv) a number of second processing (e.g., decoding) layers of the neural network and a number of neural network nodes in each of said second processing layers (e.g., decoding layers), one of said second processing layers providing said output values of the neural network; (v) a number of neural network nodes in a bottleneck layer of the neural network, said bottleneck layer of the neural network having the fewest number of neural network nodes of any layer of the neural network containing neural network nodes, said bottleneck layer receiving inputs from one of said first processing layers (e.g., encoding layers) and providing outputs to one of said second processing layers (e.g., decoding layers); (vi) a loss function for the neural network that minimizes the error between the neural network output values and a subset of the neural network input values.

In some embodiments, prior to training the neural network the processor controls the operation of the system to configure the neural network to have: (i) a maximum input vector size for the neural network, said input vector size being the maximum number of input values that the neural network can receive for processing at a single instance; (ii) a maximum output vector size for the neural network, said output vector size being the maximum number of output values the neural network will produce, said maximum number of output values being less than said maximum number of input values; (iii) a number of neural network nodes in a bottleneck layer of the neural network, said bottleneck layer of the neural network having the fewest number of neural network nodes of any layer of the neural network containing neural network nodes; (iv) a number of processing (e.g., encoding) layers of the neural network and the number of neural network nodes in each of said processing layers; (v) a number of processing (e.g., decoding) layers of the neural network and the number of neural network nodes in each of said decoding layers; (vi) a loss function for the neural network that minimizes the error between the neural network output values and a subset of the input values.

In some embodiments, when said determined score is at or below the first threshold, the system is controlled by said processor to determine that an anomaly condition does not exist with respect to the first anomaly group classification instance.

In some embodiments, the operation to determine a score for the first anomaly group classification instance based on the output values of the trained autoencoder neural network includes determining a loss function value which measures the difference between the inputted key performance indicator values and the corresponding autoencoder neural network values.

In some embodiments, the score for the first anomaly group classification instance is the determined loss function value.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 11 illustrates a histogram of reproduction error values.

FIG. 12 comprises FIGS. 12A and 12B.

FIG. 12A illustrates a first part of a flowchart of a method in accordance with an embodiment of the present invention.

DETAILED DESCRIPTION

As previously discussed, a telephony network typically handles a wide variety of traffic, and a common problem in network management and security protection is detecting anomalies in network behavior relative to normal behavior. Complicating this problem is that the expected traffic patterns may vary widely by source, destination, subscriber, trunk groups, hour-of-day, day-of-week, and various other possible classification groups. Modeling the entire network and checking traffic against a global model is problematic since it requires either numerous small changes or a very large change to affect the overall network traffic. Furthermore, building separate models for each instance of interesting groupings results in an explosion of model instances, often resulting in overfitting due to insufficient data, overfitting being the production of an analysis that corresponds too closely or exactly to a particular set of data, and may therefore fail to fit additional data or predict future observations reliably.

Figure 8:
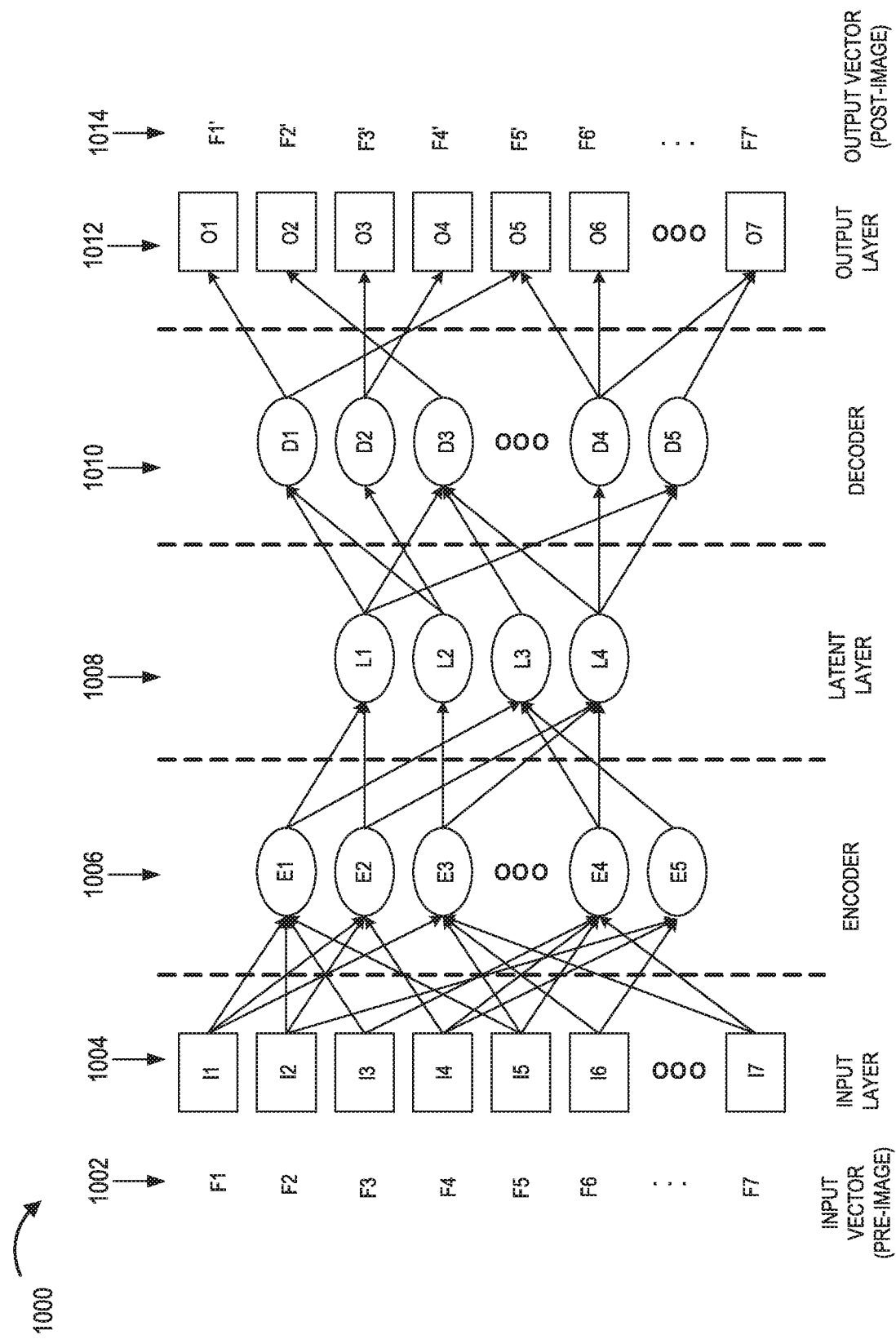
FIG. 8 illustrates an autoencoder neural network.

In recent years, the autoencoder neural-network (AEC NN) approach to anomaly detection has been applied to a variety of domains including credit card fraud detection, failure prediction in supercomputer applications, and breast cancer detection from mammogram analysis. FIG. 8 illustrates the architecture of an autoencoder neural network 1000. The neural network 1000 includes an input layer 1004, an encoder 1006, a latent layer 1008, a decoder 1010, an output layer 1012. The encoder and decoder are shown as having a single layer of neural network nodes but in practice may have a plurality of layers. The input vector (pre-image) 1002 includes the input values F1, F2, F3, F4, F5, . . . , F7 and are input into the nodes of the input layer 1004. The encoder 1006 is shown as including neural network nodes E1, E2, E3, . . . , E4, and E5. The latent layer or bottleneck layer 1008 has the fewest neural network nodes L1, L2, L3, L4. The decoder 1010 has neural network nodes D1, D2, D3, . . . , D4, and D5. The output layer 1012 receives the output values from the decoder 1010 and outputs the output vector (post-image) 1014 including F1', F2', F3', F4', F5', F6', . . . , F7'. The F1', F2', F3', F4', F5', F6', . . . , F7' output values are the reproduced input values F1, F2, F3, F4, F5, F6, . . F7. The neural network being trained to minimize the loss or error between the input vector (pre-image) and the output vector (post-image). The input and output values are numerical values (e.g., floating point values between 0 and 1 or between −1 and 1). The arrows between the different layers represent neural network links. The value or weightings of the links are determined during the training of the autoencoder neural network.

The basic approach is consistent: (1) train an autoencoding network to minimize the reproduction error against a source "image"; (2) use the reproduction error against this trained network as a metric for whether a new "image" is anomalous or not. The typical autoencoder neural-network, however, does not address the use case and problems described above. Applying this approach to the problem would effectively produce a single global model that can detect anomalies of the traffic at an overall network level whereas the technological problem is the need to detect anomalies at granularity across multiple dimensions. Furthermore, one cannot simply split the problem and apply the AEC NN at a per-dimension-instance level because that leads back to the same data availability problem discussed above in connection with the EMA/EMV models. Actually, the problem is much worse since the AEC-NN has many more free parameters and requires correspondingly more data.

As previously discussed one can appreciate that there is a need for new and/or improved methods, systems, and apparatus which address the aforementioned problems/deficiencies.

The present invention describes a new architecture with the ability to use an anomaly detection model which behaves as logically separate models for cases where separate models are necessary but behaves as a shared model otherwise. Furthermore, the model itself discovers when it can use a shared logical model versus per-instance logical models.

An exemplary embodiment of the present invention will now be discussed. The exemplary embodiment is for an enhanced Traffic Sentry Trunk Group Anomaly Detector. This detector monitors for 9 trunk group (TG) KPIs: ingress and egress bids, ingress and egress connects, ingress and egress minutes of usage (MOU), along with bids, connects, and MOU independent of direction. The detector supports up to 1000 separate trunk group instances. This is a simplified version wherein the granularity of the data is at a trunk group level, but the hour-of-day and day-of-week are not considered (i.e., all hours of all days are considered equivalent). An example architecture for this Trunk Group Anomaly Detector is shown diagram 900 of FIG. 9.

The input layer 902 is comprised of a combination of "true" inputs 940, i.e. the values of the 9 KPIs for each data sample, and a set of selector nodes 1, . . . , 1000. The true input set 940 includes input 1 912, input 2 914, input 3 916, . . . , input 8 918, and input 9 920. The selector nodes 942 also referred to as selectors 942 include selector node 1 922, selector node 2 924, . . ., selector node 1000 926. The selector nodes are fed with a one-hot encoding of the trunk group associated with the data sample. The encoder 904, latent 906, and decoder 908 layers are similar to those in an autoencoder neural network. The example above shows a single encoder layer 904 and decoder layer 908, but the neural network can include more than one encoder layer and/or more than one decoder layer. The latent layer of the neural network is a bottleneck layer including the fewest neural network nodes of any layer in the neural network. The output layer 910 reproduces the same KPI set as the true inputs (912, 914, 916, . . . , 918, 920). All of these values will be numerical values, with the same scale as the input values. The output set 944 includes output 1 928, output 2 930, output 3 932, . . . , output 9 934. Diagram 900 illustrates the KPI input values for input nodes 912, 914, 916, . . ., 918, 920 of input layer 902 as having values I1', I2', I3', . . . , I8', I9' respectively. Diagram 900 illustrates the selector values for selector nodes 922, 924, . . . , 926 of input layer 902 as having values S1, S2, . . . , S1000. The encoder 904 is illustrated as having neural network encoder nodes E1', E2', E3', . . . , E4', E5'. The latent layer 906 is illustrated as having node L1', L2', L3', L4'. The decoder 908 is illustrated as having neural network decoder nodes D1', D2', D3', . . . , D4', D5'. The output nodes 928, 930, 932, . . . , 934 of output layer 910 is shown as having output values O1', O2', O3', O4', . . . , O9' respectively which makeup the output vector 944. Each of the arrows from the Input Layer nodes I1', I2', I3', . . . , I8', I9', S1, S2, . . . , S1000 902 to the Encoder nodes E1', E2', E3', . . . , E4', E5' 904 are neural network links having weightings. Each of the arrows from the Encoder 904 neural network nodes E1', E2', E3', . . . , E4', E5' to the neural network latent layer 906 nodes L1', L2', L3', L4' are neural network links having weightings. Each of the arrows from the latent layer neural network nodes L1', L2', L3', L4' to the decoder 908 neural network nodes D1', D2', D3', ..., D4', D5' are neural network links having weightings. Each of the arrows from the decoder 908 neural network nodes D1', D2', D3', ..., D4', D5' to the output layer 910 neural network nodes O1', O2', O3', ..., O9' are neural network links having weightings. The value or weightings of the links are determined during the training of the neural network. It is to be understood that the number of nodes illustrated in each layer of the neural network of diagram 900 is only for illustrative purposes as different numbers of nodes per layer as well as encoder and decoder layers may be, and in some embodiments are, implemented depending on the application. The latent layer however is a bottleneck layer and has the fewest nodes of the different layers of which the neural network is comprised.

The selector inputs (922, 924, ..., 926) only affect the link weights to the extent that they control the true input reproduction and not the selectors themselves. Therefore, the loss function here will be different than a typical auto-encoder neural network which considers reproduction error relative to the whole input. The actual loss function in some embodiments incorporate further stratified weighting of the input nodes in the reproduction error. For example, the error due to a cost key performance indicator might be higher than that due to a count key performance indicator as the former has a more direct monetary cost to the operator. In at least some of these embodiments, the standard cross-entropy loss measure often used in neural networks is not used as it does not produce the desired results.

Once the architecture of the neural network, including the non-traditional loss function, is defined for the particular use case, the neural network is trained and deployed.

The training process is the optimization of the weights of the links between nodes of the adjacent layers. The links are shown in diagram 900 as lines with arrows connecting the nodes of one layer to the nodes of another layer. Since in some methods the weights can go to zero, this also indirectly determines which links should be removed entirely. Any one of the common machine learning frameworks such as TensorFlow, MxNet, Keras, and Torch can be used for training the neural network. All provide methods for defining the network in terms of nodes, layers, linkage, and activation functions, and for then training the network on training data to minimize some objective function.

The architecture and process described results in a system that solves one or more of the aforementioned problems. For example, recall that among the objectives were: (1) effectively using a separate model when an instance's characteristics are significantly different from the group, but use a common model when it is not; (2) incorporate the correlations among KPIs into the expected baseline behavior. For one of skill in the art, it should be evident that due to the bottleneck nature of the latent layer of the neural network, subsets of the encoding layer associated with distinct trunk group instances will be minimized and common subsets reused when the selector variables are unimportant to the reproduction error. For the same reason, subsets of the encoding layer associated with distinct key performance indicators will be minimized, and common subsets reused when an additional key performance indicator is highly correlated with another key performance indicator. In summary, the bottleneck effect forces the reuse of encoding nodes for unremarkable trunk group instances and key performance indicators, thereby achieving both objectives.

It should be clear that the architecture is easily extensible to additional selector variables. For example, the architecture incorporating both the trunk group instance selector and the hour-of-day/day-of-week selector is shown diagram 1200 of FIG. 10. Diagram 1200 illustrates input layer 1202, encoder 1204, latent layer 1206, decoder 1208 and output layer 1210. While the number of nodes in the encoder 1204, latent layer 1206, decoder 1208 have been shown as the same as in diagram 900, it should be understood that in practice the neural network shown in FIG. 10 will require a larger encoding, latent bottleneck, and decoding layers (i.e., layers with more neural network nodes) to produce equivalent reproduction errors to the neural network illustrated in diagram 900, but the same logical pruning for unremarkable hour-of-day/day-of-week will be effected. In diagram 1200 of FIG. 10, the true input 1240 includes input nodes 1212, 1214, ..., 1216, which includes input values corresponding to the KPI values of I1", I2", ..., I9" respectively. The trunk selectors 1242 including input nodes 1218, 1220, ... 1222 which include values TS1, TS2, ..., TS1000 respectively. The Time Of Day/Day Of Week (TOD/DOW) Selectors 1244 include selectors 1224, ..., 1226 which have values TDS1, ..., TDS 7X24 (168). The trunk selector inputs and the TOD/DOW selector inputs will respectively select a particular trunk and the time of day/day of week to which the true input KPI values I1", I2', ..., I9" correspond. The output layer 1210 nodes 1228, 1230, ..., 1232 are shown as having output values O1", O2", ..., O9" respectively which make up the output vector 1248. The neural network defined and trained as described above can be used to build the desired traffic anomaly detector. The training data is first batch processed through this trained network to produce a data set of the final reproduction error values. Diagram 1100 of FIG. 11 illustrates an exemplary graph obtained by aggregating and plotting the final production error values as a histogram.

From such a dataset of reproduction errors, it is a straightforward exercise to compute the threshold values for various percentiles. For example, one can determine that the $90^{th}$ percentile corresponds to a reproduction error of 0.1 and the $99^{th}$ percentile maps to a reproduction error of 0.125. With a granular enough percentile table, one approach to "scoring" the key performance indicators for a trunk group interval is as follows:

Compute the KPIs for the interval and, along with the selector variables, run the KPIs through the neural network to produce a reproduction of the KPIs.

Compute the reproduction error of the reproduced KPIs versus the input KPIs.

Determine the best matching percentile from the percentile table.

The final determination of anomaly versus normal will be made based on this determined percentile. For example, in the simplest case, if the percentile is beyond some pre-selected threshold value (for example 1%), flag the entry as an anomaly. In another embodiment which involves a more complicated scheme a windowing function is incorporated or used such that some number of such events must occur within a window for the case to be flagged. It should be understood that the neural network reproduction error, either directly or indirectly, singularly or in part, determines whether a tentative interval KPI set is flagged as anomalous or not.

Once an anomaly has been flagged/detected, an operator can be notified and/or a mitigation action can be taken.

Various exemplary systems and methods implemented in accordance with the present invention will now be discussed.

Figure 1:
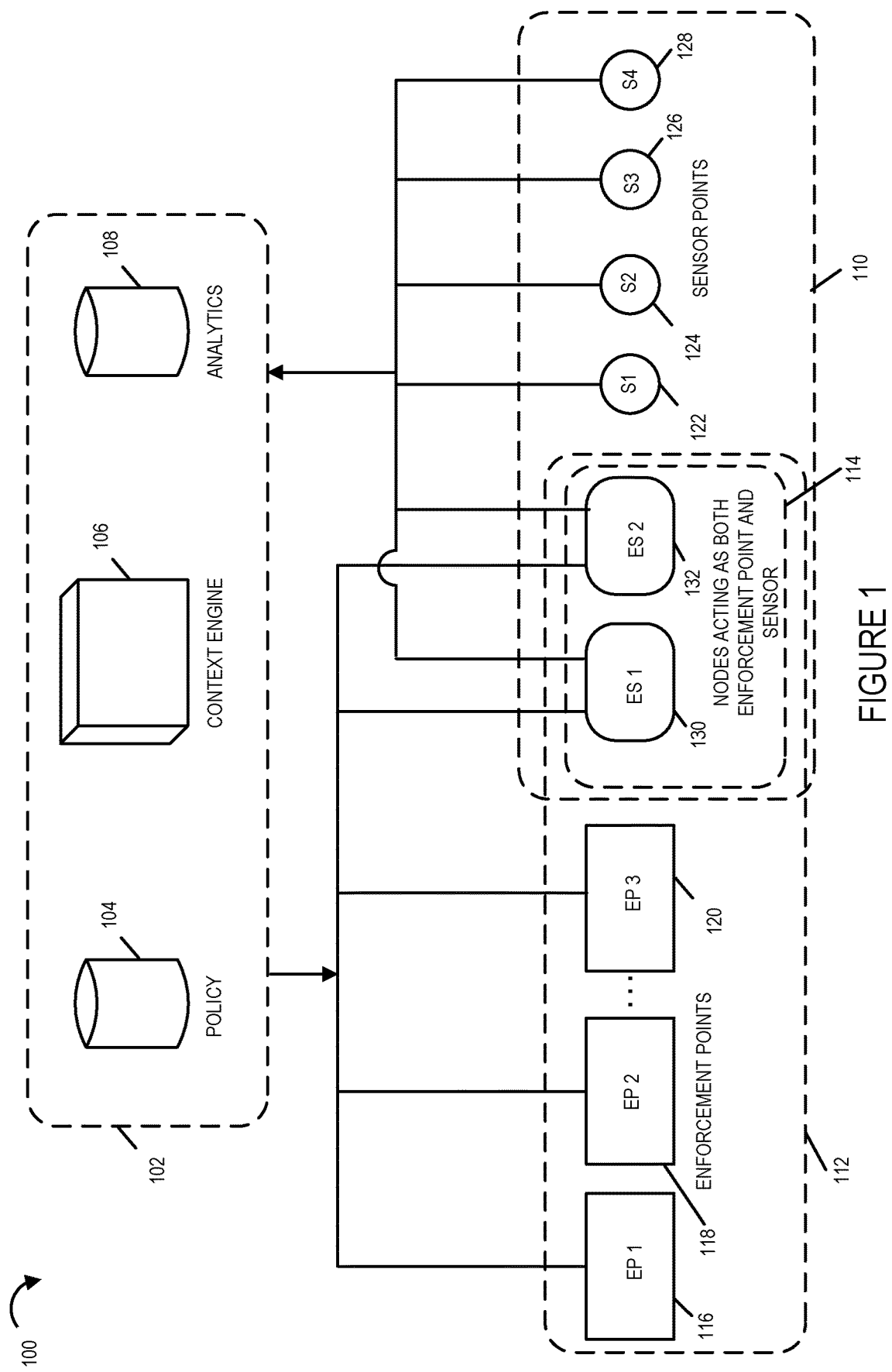
FIG. 1 illustrates an exemplary closed loop system for identifying and mitigating Unified Communications threats and/or anomalies in accordance with an embodiment of the present invention.

Diagram 100 of FIG. 1 illustrates the key components of an exemplary system architecture in accordance with one embodiment of the present invention.

At this level the solution is relatively straight forward. It includes three main domains—the Context Domain 102, the Sensor Domain 110, and the Enforcement Domain 112. The Sensor Domain 110 is also referred to herein as the Sensor Points Domain 110 and the Enforcement Domain 112 is also referred to herein as the Enforcement Points Domain 112. Each of these three main domains includes at least one or more elements/devices of the system.

The Context Domain 102 is the decision-making part of the architecture/system. In the exemplary system architecture 100, the Context Domain includes at least the following elements or components: a context engine 106, an analytics component 108, and a policy component 104. The Context Engine component 106 is an extensible engine that is responsible for digesting the feedback from the sensor points of the system and based on the feedback determining what actions to take. For example, the context engine 106 receives information from one or more sensors S1 122, S2 124, S3 126, S4 128, ES 1 node 130 and ES 2 node 132, analyzes the received sensor information and determines actions to be taken based on system policies and generates commands to send to the enforcement points/devices which implement the commands.

The analytics element or component 108 includes a database system including a processor and a storage device. In the database system is stored data/information received from the sensors of the system, e.g., from the sensor points of the sensor domain 110. The database system is in most, but not all, embodiments located in the cloud and is implemented using high-scale cloud database technology. The analytics element 108 may be, and in some embodiments is, implemented as a cloud database system as part of the same cloud platform including the context engine 106 and the policy element 108.

The policy element or component 104, similar to the analytics element 108, includes a database system including a processor and a storage device. Stored in the policy element 104 database system are user defined policies, essentially the instructions that tailor the decision process of the context engine 106, the stored polices being instructions or rules used by the context engine 106 to make decisions based on data/information received from sensors in the system and generate enforcement instructions which are communicated to and enforced at one or more enforcement points in the system.

The sensor domain or sensor points domain 110 includes one or more sensor points, e.g., devices, in the network which collect data. The sensor points may be, and in some embodiments are, dedicated pieces of software such as a purpose-built Session Initiation Protocol (SIP) proxy or an Application Programming Interface (API) gateway, or the sensor points may be, and some are, embedded code within a larger platform or device such as for example a Session Border Controller (SBC). The sensor points of the sensor domain 110 offer and/or publish data towards the context domain 102 and the elements included in it.

The enforcement domain 112 includes one or more enforcement points EP 1 116, EP 2 118, . . . , EP 3 120 in the system network that alter the nature of the traffic in the system 100. The enforcement points include devices with existing enforcement functions such as, for example, firewalls, Session Border Controllers (SBCs), Software Defined Networking SDN switches (e.g., Open Flow switches), etc. These devices may already be deployed in an existing network and/or serve other functions in the network. Additionally, enforcement points may include dedicated devices and/or components inserted specifically as enforcement points to control the flow of traffic in the system 100.

In some embodiments, there are nodes, components or devices that are part of both the sensor domain 110 and the enforcement domain 112. These nodes, components and/or devices act as both an enforcement point and a sensor point. Region 114 of FIG. 1 illustrates components ES 1 130 and ES 2 132 which are nodes that perform as both an enforcement point and a sensor point.

Figure 2:
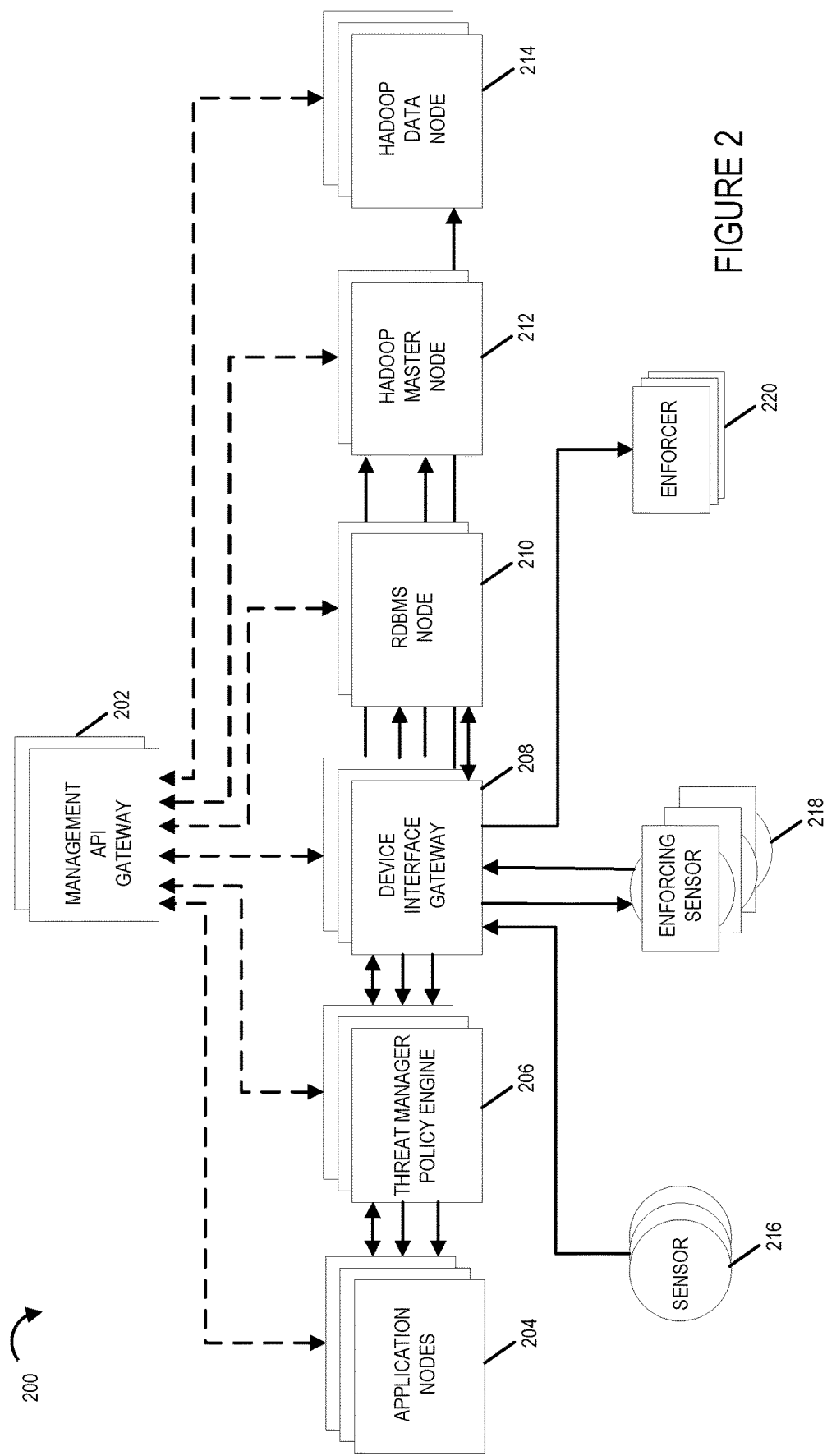
FIG. 2 illustrates details of the exemplary system illustrated in FIG. 1.

Diagram 200 of FIG. 2 illustrates internal or subcomponents of system 100. At the bottom of the system architecture are the sensors 216, enforcers 220 and equipment 218 that are both sensors and enforcers. The sensors 216 are deployed within the network and generate events of import. The enforcers 220 are network actors, e.g., devices that apply policy to control some behavior. Some equipment 218 within the network perform as both a sensor and an enforcement device. An example of such equipment includes a session border controller, e.g., SBC 826 of FIG. 3, which performs as a sensor to detect and report registration failures on a traffic flow and also performs as an enforcement device by applying an Access Control List (ACL) to block that flow.

The Device Interface Gateway (DIG) nodes 208 form the interface between the sensors 216 of the sensor domain 110 and enforcers 220 of the enforcement domain 112 in the network into the security platform. On the ingress side, the device interface gateway nodes 208 receive or collect the applicable data, parse the data, build Parquet files, and write into the Hadoop Distributed File System (HDFS) cluster and relevant streaming interfaces. On the egress side, the device interface gateways (DIGs) accept configuration and status requests from the Management API Gateway (MAG) 202, enforcement requests from the Policy Engine and transform them into the appropriate device-specific commands which are communicated towards the devices.

The Hadoop Master node 212 and Hadoop Data nodes 214 together form a Hadoop cluster. This includes all the facilities for HDFS cluster storage, Hadoop map-reduce job execution, and Spark batch and streaming support. In some embodiments, standard Hadoop functionality is used in the system, so it easily supports deployments where the Hadoop cluster is provided as-a-service by the operator.

The Postgres nodes 210 supply a traditional relational DBMS service. Some applications may do batch processing of the data in the Hadoop cluster but store the resulting database to Postgres for certain query types. Additionally, system and application configuration will be saved in Postgres.

The Threat & Incident Manager (TIM) and the Policy Engine (PE) nodes 206 are system level components which manage and mitigate threats and incidents. The Threat & Incident Manager serves as the central coordinator for incidents and tracks the overall life-cycle of incidents. It receives incidents and indications from all applications and nodes in the system and initiates actions for the automated incident mitigations. For other incident types, it presents the incidents to the operator and accepts operator directives for actions on the incidents. The Policy Engine implements the policies, e.g., rules, of the system. This is based on directives and/or instructions from the Threat & Incident Manager coupled with the configuration and knowledge about enforcement points in the network. At a high level, the TIM deals in generic actions (such as, for example, BLOCK_CALLING_NUMBER) and the PE implements this on the specific network (e.g., add calling-number block to master centralized policy server such as for example PSX 824 illustrated in FIG. 3).

The Application nodes 204 implement a variety of applications for the system. These applications are incorporated and executed within the eco-system and rely on specialized services of the platform. These applications could run the gamut. Examples include applications for chart trending, for TDoS (Telephony Denial of Service) detection, for Key Performance Indicator (KPI) monitoring, Traffic Analyzer for historical analysis, and for Robocall detection and mitigation. It is to be understood that the list of applications is only exemplary and that various applications may be, and in some embodiments are, included as separate licensable components for optional activation in various deployments.

The Management API gateway (MAG) 202 is the management interface to the platform. This provides a northbound REST API (Representational State Transfer Application Programming Interface) for configuring and managing the platform. MAG 202 determines whether to handle received requests directly or whether to proxy to a particular node or node-type within the system. The MAG 202 also hosts the user interface (UI) for the system. The UI is in some embodiments implemented as a JavaScript application. Upon initial https connection to the MAG 202, the UI, e.g., UI JavaScript, is downloaded to the user's browser and executed.

Figure 3:
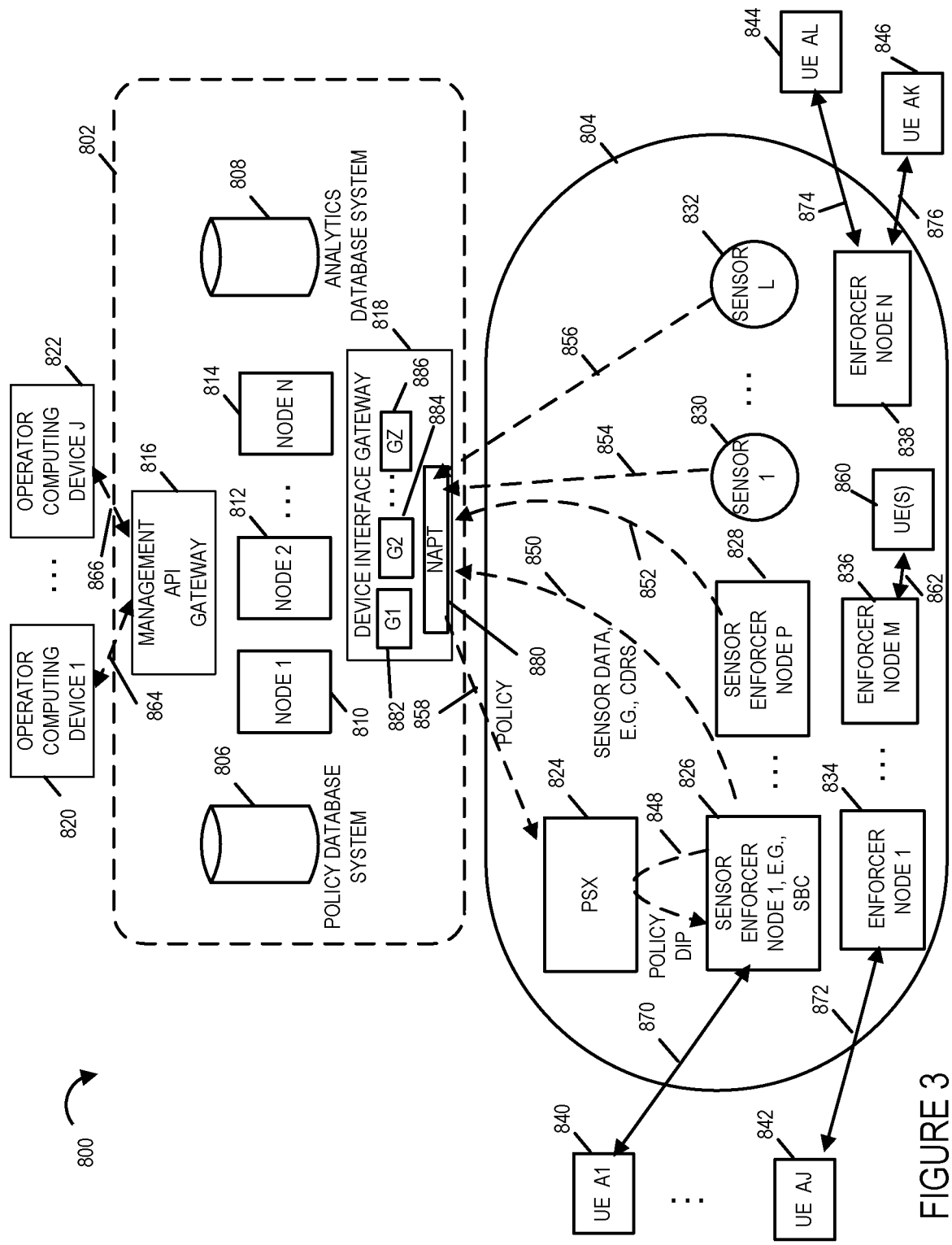
FIG. 3 illustrates an exemplary communications system in accordance with an embodiment of the present invention.

The elements, components, nodes, data systems illustrated in FIGS. 1, 2, and 3 are coupled together via communications links, e.g., bi-directional communications links. While various communications links are illustrated, other network configurations are possible and for the sake of simplicity not all of the communications links or network connections connecting the various nodes/devices have been shown.

Various kinds of monitoring and threat detection may be encompassed in different types of applications running within the contextual plane. As an example, an anomaly based on Key Performance Indicators (KPIs) detection application would monitor for traffic anomalies based on KPI values. The traffic anomaly detector can identify anomalous traffic conditions based on the received KPI values or call detail records from which the KPI values can be determined or derived for successive time intervals.

Another advantage of the present invention is that sensors and sensor enforcer nodes can non-intrusively monitor, collect and provide information (e.g., call record reports (CDRs)) on the Unified Communications traffic to the node(s) executing threat and anomaly detection and mitigation application(s). The threat and anomaly detection and mitigation applications can perform their detection and selection of mitigation actions to be taken independently from the call processing activities of the call processing devices (e.g., call processing nodes such as SBCs, PBXes, and SDN switches) performed during the receipt of incoming calls, the threat and anomaly detection and mitigation applications' processing of data sets (e.g., call records, application level data, etc.) being off-line processing occurring for example on a periodic basis, the call processing of calls by enforcer nodes being unaffected by the off-line processing of the data sets for the detection of threats and anomalies. Upon the detection of a threat or an anomaly, a policy update to mitigate the detected threat or anomaly can then be communicated to the enforcement nodes such as the call processing nodes to enforce the mitigation policy. The use of off-line processing independent of the call processing by the enforcement nodes provides efficiency of the overall system throughput in that the call processing of the system is not affected by the threat and anomaly detection and mitigation application processing which is independent of the call processing for calls of the system.

In some embodiments, one or more of the elements, nodes or components of the above mentioned systems are implemented within one or more virtual machines. The one or more virtual machines may be, and typically are, implemented on one or more compute nodes in the cloud, a compute node including a processor providing storage, networking, memory, and processing resources, e.g. one or more processors that can be consumed by virtual machine instances. In some embodiments, multiple nodes are implemented within a single virtual machine. In some embodiments, the virtual machine itself holds a container environment, with multiple containers spawned within the virtual machine to each implement a node function. In one mode of operation, the containers to be instantiated are determined at virtual machine instantiation and then stay static throughout the life of the virtual machine. In a second mode of operation, the containers instantiated within the virtual machines are completely dynamic. The virtual machine starts with some set, such as for example an empty set, of containers and then new containers are added and existing containers removed dynamically.

Figure 5:
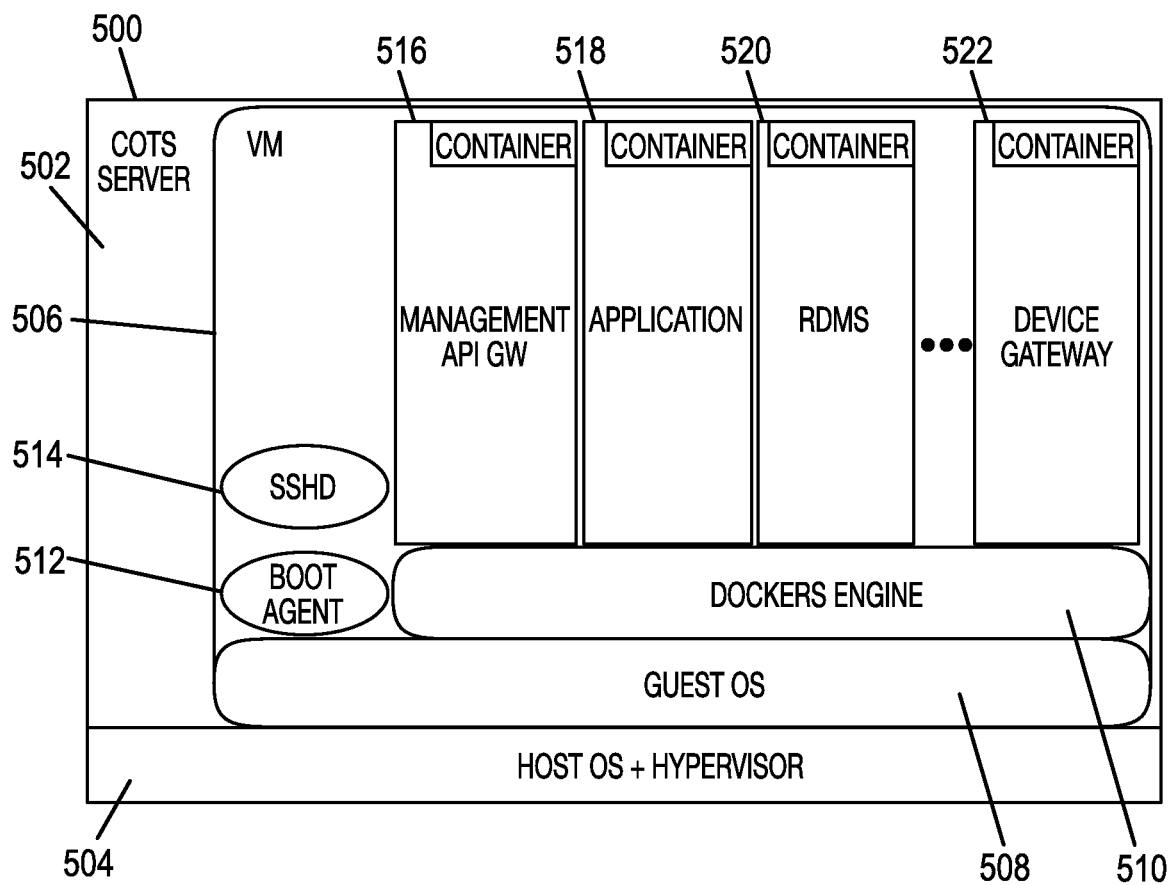
FIG. 5 illustrates an exemplary system in accordance with an embodiment of the present invention.

FIG. 5 illustrates an exemplary system 500 in accordance with an embodiment of the present invention. The exemplary system 500 includes commercial off the shelf server hardware 502 with host operating system and hypervisor software 504 that is used to virtualize the hardware resources, and a virtual machine 506. The hypervisor is software that is run on the host operating system and provides various virtualization services, such as for example I/O device support and memory management. The virtual machine 506 includes a guest operating system 508, a Dockers Engine 510, a boot agent 512, an OpenSSH server process (sshd) 514, and a plurality of exemplary containers, the plurality of exemplary containers including a Management API Gateway node container 516, an Application node container 518, RDMS node container 520, . . . , a Device Gateway node container 522.

The guest operating system (guest OS) 508 is the software installed on the virtual machine (VM) and is different than the host operating system. The dockers engine software 510 creates a server-side daemon process that hosts images, containers, networks and storage volumes. The dockers engine also provides a client-side command-line interface (CLI) that enables users to interact with the daemon through a Docker Engine API. The boot agent is software instructions that are executed during the boot up process. The sshd 514 is an OpenSSH server process that listens to incoming connections using the Secure Socket Shell (SSH) protocol and acts as the server for the protocol. It handles user authentication, encryption, terminal connections, file transfers, and tunneling.

In some system embodiments, containers are not used as shown in FIG. 5. In such systems, there is no Dockers Engine 510 and each node shown in FIG. 5 is instead implemented directly within a virtual machine. For example, the Management API Gateway node 516, an Application node 518, RDMS node 520, . . . , a Device Gateway node 522 are implemented on separate virtual machines with each node being mapped to a different virtual machine. In this way each node is implemented on a separate virtual machine.

Figure 6:
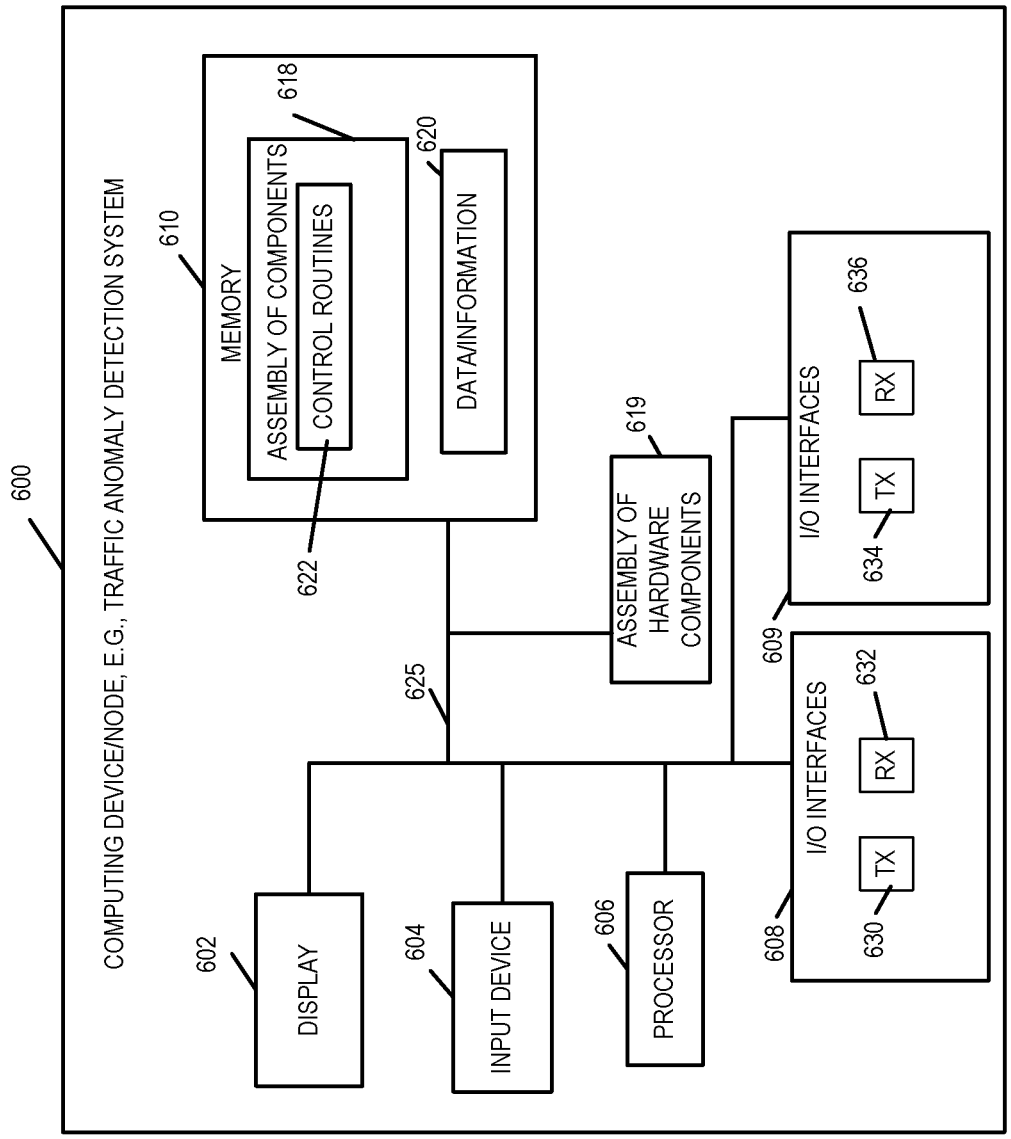
FIG. 6 illustrates an exemplary computing device/node in accordance with an embodiment of the present invention.

In some embodiments, one or more of the elements, nodes or components of the above mentioned systems are implemented in accordance with the exemplary computing device/node 600 illustrated in FIG. 6.

Exemplary computing device/node 600 includes an optional display 602, an input device 604, a processor 606, e.g., a CPU, I/O interfaces 608 and 609, which couple the computing device/node 600 to networks or communications links and/or various other nodes/devices, memory 610, and an assembly of hardware components 619, e.g., circuits corresponding to different components and/or modules, coupled together via a bus 625 over which the various elements may interchange data and information. Memory 610 includes an assembly of components 618, e.g., an assembly of software components, and data/information 620. The assembly of software components 618 includes a control routines component 622 which includes software instructions which when processed and executed by processor 606 control the operation of the computing device/node 600 to perform various functions and/or one or more steps of the various method embodiments of the invention. The I/O interface 608 includes transmitters 630 and receivers 632. The I/O interface 609 includes transmitters 634 and receivers 636. The I/O interfaces are hardware interfaces including hardware circuitry. The computing device/node 600 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Internet Protocol (IP), Transport Control Protocol (TCP), User Datagram Protocol (UDP), WebRTC protocols, Representative State Transfer (REST) protocol, SQL (Structured Query Language) Protocol, and HDFS (Hadoop Distributed File System) Protocol, SQL and/or HDFS being used to interface and access information from the various databases and/or storage devices to which it may be coupled. In some embodiments, the computing device/node 600 includes a communication component configured to operate using IP, TCP, UDP, REST, SQL (Structured Query Language), or HDFS (Hadoop Distributed File System). In some embodiments, the communications component is a hardware component, a software component or a component including hardware and software components. While only a single hardware processor is illustrated in some embodiments, it is to be understood that the computing device/node 600 can include more than one processor with the processing being distributed among the plurality of processors. In some embodiments, one or more of the following are implemented in accordance with the computing device/node 600 illustrated in FIG. 6: context engine element 106, management API gateways 202, application nodes 204, threat manager and policy engine nodes 206, device interface gateways 208, enforcer devices 220, sensors 216, nodes, sensors, and devices illustrated in system 800.

Figure 7:
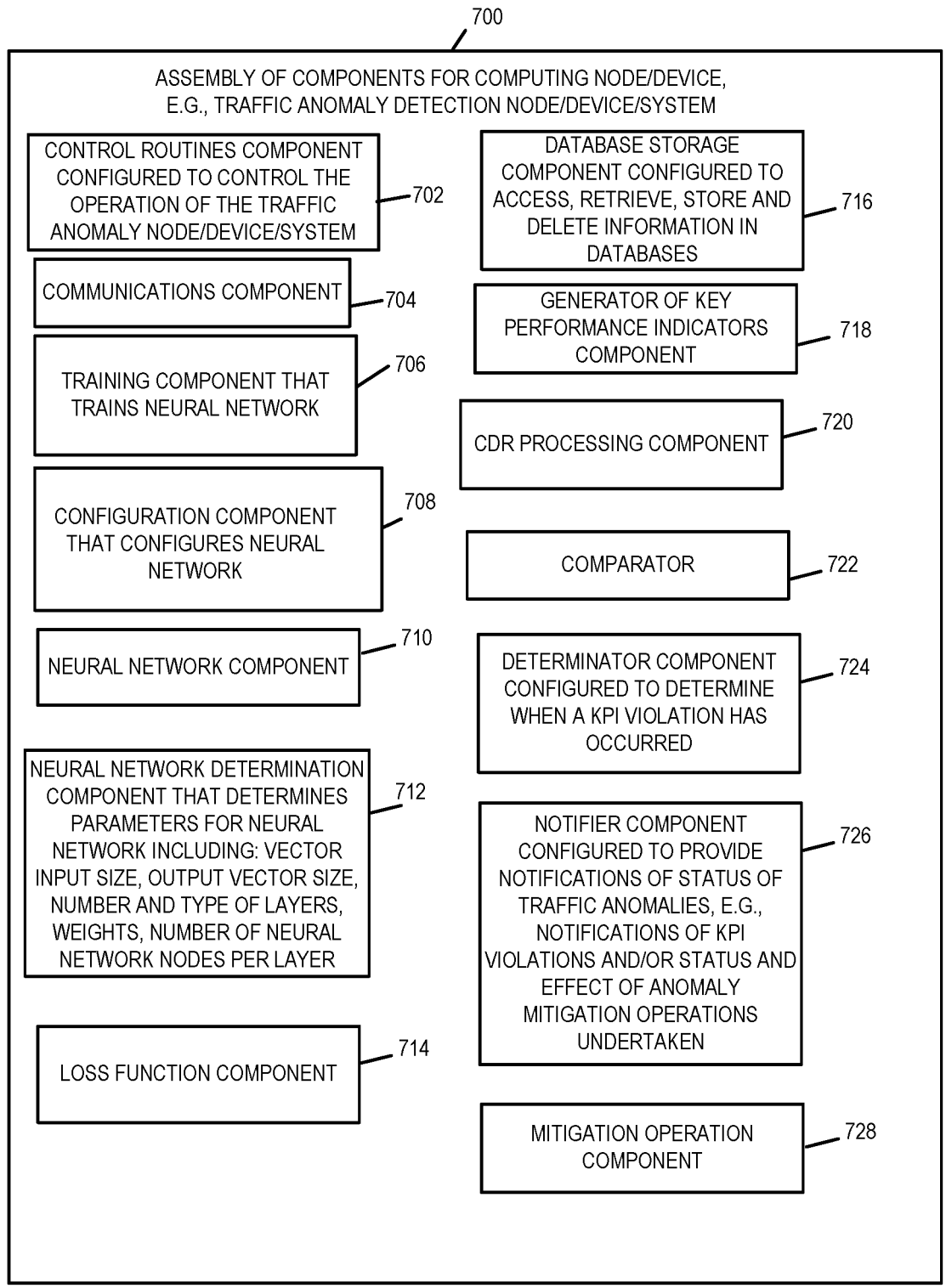
FIG. 7 illustrates an exemplary assembly of components for a computing device/node, e.g., a traffic anomaly detection node/device, in accordance with an embodiment of the present invention.

An exemplary assembly of components 700 for a computing node 600 implemented as a node or device, e.g., a node executing an application for threat detection and mitigation in accordance with an embodiment of the present invention is illustrated in FIG. 7. One or more of the assembly of components 700 may be implemented as hardware components in the assembly of hardware components 619 or as software components in the assembly of software components 618 stored in memory 610 of the exemplary computing node/device 600. The assembly of components 700 will be discussed in further detail below.

Communications system 800 of FIG. 3 illustrates another exemplary system embodiment of the present invention. Communications system 800 illustrates a monitoring/protection system in combination with a Unified Communications system that integrates multiple forms of real-time communications technologies including voice, video, collaboration, presence information and text messaging. Communications system 800 includes a threat and anomaly detection and mitigation protection sub-system 802 to which a plurality of operator computing devices 1 820, . . . , J 822 are coupled and a communications network 804 to which a plurality of user equipment devices is coupled. The user equipment devices coupled to the communications network 804 include UE A1 840, . . . , UE AJ 842, UE AL 844, UE AK 846 where J, K, L are positive integers greater than 1 such as for example 10, 11, 12. The user equipment devices are communications devices, e.g., mobile devices, cell phones, smartphones, computers, laptops, tablets, landline phones, IMS mobile phones, and PBX phones. The threat and anomaly detection and mitigation protection sub-system 802 includes the following elements which are connected via communications links so that they can exchange information: a device interface gateway 818, a management Application Programming Interface (API) gateway 816, a plurality of nodes 1 810, node 2 812, . . . , node N 814 where N is positive integer greater than one, a policy database system 806, and an analytics database system 808. In some embodiments, the node 1 810, node 2 812, . . . , node N 814 each include one or more processors which execute code stored in memory that control the operation of the node, the memory being included in the node or coupled to the node. One, some or all of the nodes 1 810, 2 812, . . . , N 814 execute one or more threat and anomaly detection and mitigation applications, e.g., an anomaly detection based on KPIs and mitigation application, a fraud detection and mitigation application, an International Revenue Share Fraud (IRSF) threat detection and mitigation application, a Premium-rate Revenue Share Fraud (PRSF) threat detection and mitigation application, a service theft detection and mitigation application, a denial of service threat detection and mitigation application, a Wangiri type fraud threat detection and mitigation application, and an exfiltration attempted threat detection and mitigation application. The policy database system 806 is a storage device which includes policies and/or rules that define actions to be taken in response to detected threats and/or anomalies.

The analytics database system is a storage device in which data and information, e.g., call data records also referred to as call detail records, key performance indicator information, traffic information, user information, application level metrics, data link layer data and physical layer data regarding the traffic in network 804, is stored after being received/provided by sensors and sensor enforcer devices in the network 804. In some embodiments, also stored in the analytics database system 808 are traffic characteristics and/or patterns and/or models used to identify/detect traffic instances and/or threats.

The policy database system 806 and analytics database system 808 in some embodiments are a single database system that includes the data and information included in the policy database system and the analytics database system. In some embodiments the policy and/or analytics database systems are implemented as a Hadoop Distributed File System (HDFS) or cluster.

The management API gateway 816 is a gateway device/node through which the threat detection system 802 communicates with system operator communications/computing devices 1 820, . . . , J 822, where J is a positive integer greater than 1. Communications include for example notifications from the threat detection and mitigation sub-system 802 of detected threats and operator input indicating actions to be taken in response to detected threats. While the operator computing devices 1 820, . . . , J 822 are shown as being outside of the communications network 804, in most embodiments at least some of the operator computing devices are part of the network 804 and/or receive communications over the network 804. In most embodiments, at least some of the operator computing devices 1 820, . . . , J 822 are directly connected to the management API gateway so that congestion and other attacks on the network 804 will not compromise the communications links between these operator computing devices and threat detection and mitigation protection sub-system 802. Communications links 864, . . . , 866 connect operator computing device 1 820, . . . , operator computing device J 822 respectively to the management API gateway 816 of the threat detection and mitigation protect sub-system 802. Exemplary operator computing devices include a computer, a dumb terminal, a mobile device, a smartphone, a laptop, or a tablet of the operator. In some embodiments, at least one of the operator computing devices 820, . . . , 822 is a security information event management (SIEM) system or a device executing a SIEM application where the SIEM system or application is being used in conjunction with the threat detection and mitigation sub-system to manage the security of the communication systems 800.

The device interface gateway 818 couples the nodes and database systems of the threat detection and mitigation sub-system 802 to the devices, nodes and equipment of the network 804. The device interface gateway operates to translate between communications protocols and application programming interfaces of devices, nodes and equipment of the network 804 and the sub-system 802 to exchange data, information, policies, instructions and commands. In the present example, the device interface gateway 818 includes a Network Address and Port Translation (NAPT) 880 sub-component and a plurality of device interface gateway components or instances G1 882, G2 884, . . . , GZ 886 where Z is positive number greater than 2. The NAPT 880 allows for a single entry point for communications into the threat detection and mitigation sub-system 802. The NAPT 880 de-multiplexes the received communications/data from the different devices directing it to the correct Device Interface Gateway component or instance (G1 882, G2 884, . . . , GZ 886) based on the device type from which the communication/data was received. Each device type specific component or instance G1 882, G2 884, . . . , GZ 886 performs a gateway function for communications exchanged between devices of the specific type for which the component or instance is configured and the threat detection and mitigation sub-system elements (e.g., nodes, database systems, management interface gateway). In the exemplary system 800 each Device Interface Gateway component or instance G1 882, G2 884, . . . , GZ 886 has a separate IP address and is dedicated to performing gateway functions for a single specific device type. In some other embodiments, a device interface gateway component or instance, e.g., G1 882, performs gateway functions for a plurality of device types. It should also be understood that authentication (and authorization) of devices and/or communications/data received from devices external to the threat detection and mitigation sub-system 802 is also performed by the Device Interface Gateway 818 and in particular by the individual device interface gateway components or instances of the Device Interface Gateway 818. In performing the authentication (and authorization) of the exchange of communications/data with devices external to the sub-system 802 (e.g., sensor, sensor enforcer nodes, enforcement nodes, centralized policy server, etc.), the Device Interface Gateway 818 forms a trust boundary that secures and protects the sub-system 802. For data and information pulled from the sensors, sensor enforcer nodes and enforcer nodes, the authentication/authorization is implied by the operator having configured each sensor, sensor enforcer nodes and enforcer node or device in the system to which the sub-system 802 will connect and the device interface gateway components or instances connect to the sensor, sensor enforcer node or enforcer node or device rather than the reverse. For data/information pulled or retrieved from sensors, sensor enforcer or enforcer nodes or devices, the authentication/authorization of the sensor, sensor enforcer, or enforcer node or device will be performed by the Device Interface Gateway 818 and in particular the device interface gateway component or instance to which the node or device connects. In some embodiments, the authentication/authorization is achieved through the use of a certificate provided by a client application when the node or device connects to the Device Interface Gateway component or instance using Transport Layer Security (TLS) protocol.

The device interface gateway node 818 and in particular each of the device interface gateway components or instances G1 882, G2 884, . . . , GZ 886 receives or collects the applicable data from the sensor and sensor enforcer nodes and, in some embodiments, parses the data, builds Parquet files, and writes the data into the analytics database system.

The device interface gateway (DIG) 818 also accepts configuration and status requests from the Management API Gateway (MAG) 816 which originate with the operator's computing devices.

Furthermore, the device interface gateway 818 (e.g., the device interface gateway components or instances included therein) receives enforcement requests/commands/instructions/policy updates from nodes 1 810, 2 812, . . . , node N 814, e.g., from the threat detection and mitigation applications being executed thereon and transforms these enforcement requests, commands, instructions, and policy updates into the appropriate device-specific commands which are then communicated towards the devices, e.g., Policy Server 824, enforcer nodes 1 834, . . . , enforcer node M 836, and sensor enforcer node 1 826, . . . , sensor enforcer node P 828.

While in this embodiment, the Device Interface Gateway 818 includes a NAPT device 880, in some embodiments the NAPT device is external to Device Interface Gateway 818 and is positioned as an interface between the sub-system 802 and network 804 so that communications with the devices/nodes of the network 804 pass through the NAPT to the device interface gateway 818.

In some embodiments, instead of device interface gateway 818 with device interface gateway components G1 882, G2 884, . . . , GZ 886, each of device interface gateway components G1 882, G2 884, . . . , GZ 886 is a separate device interface gateway or instance.

In an exemplary cloud deployed system which uses a plurality of separate device interface gateways or gateway instances, a Cloud Internet Gateway (IGw) performs the NA(P)T function of NAPT 880. Each device interface gateway instance has a public Internet Protocol (IP) address and a private IP address and all packets go through the IGw. At least some of the device interface gateways or gateways instances G1 882, G2 884, . . . , GZ 886 pull or extract data from sensor(s) and/or sensor enforcer node(s) or device(s) using the assigned public Internet Protocol (IP) address. The device interface gateways support a number of different protocols for receiving data and/or communicating instructions, commands, and/or policies. In many embodiments, a group of device interface gateway instances support a first device type and a load balancer is used to distribute communications received from different devices of the first device type to the group of device interface gateway instances supporting the first device type for processing.

The network 804 includes sensors, enforcement nodes, sensor enforcer nodes, a policy server(s) and communications links which allow for the flow of traffic through the network and the exchange of information, data, policies, rules, commands, and instructions between the sensors, enforcement nodes, sensor enforcer nodes of the network 804 as well as with the nodes, devices, database systems and device interface gateway of the threat and anomaly detection and mitigation protect sub-system 802.

The sensors include sensor 1 830, . . . , sensor L 832 where L is a positive integer greater than 1. The sensors collect data, e.g., information on the traffic in the network such as, for example, call processing time information, link congestion, user/device information, bandwidth usage, etc. in the network. The sensors may be, and in some embodiments are, dedicated pieces of software such as a purpose-built Session Initiation Protocol (SIP) proxy or Application Programming Interface (API) gateway, or the sensors may be, and some are, embedded code within a larger platform or device such as for example a Session Border Controller (SBC). The sensors may be, and in some embodiments are, nodes or devices distributed throughout the network. The sensors offer and/or publish data towards the threat detection and mitigation protection sub-system 802 and the elements included in it.

The enforcement nodes include enforcer node 1 834, . . . , enforcer node M 836. The enforcement nodes or devices alter the nature of the traffic in the system 800. Exemplary enforcement nodes include firewalls, Session Border Controllers (SBCs), Software Defined Networking SDN switches (e.g., Open Flow switches), etc. and dedicated devices and/or components inserted specifically into the network to control the flow of traffic in the system 800.

The sensor enforcer nodes include sensor enforcer node 1 826, . . . , sensor enforcer node P 828, where P is an integer greater than one. These nodes act as both an enforcement point and a sensor point. Exemplary sensor enforcer nodes include firewall devices, Session Border Controllers, Private Branch Exchanges (PBXes), application servers, configurable switches and equipment executing endpoint security applications.

User equipment devices UE A1 840, . . . , UE AJ 842, UE AL 844, UE AK 846 are coupled to the network 804 via communications links 870, . . . , 872, 874, 876 respectively. UE A1 840 is coupled to sensor enforcer 826 via communication link 870. UE AJ 842 is coupled to enforcer node 1 834 via communications link 872. UE AL 844 is coupled to enforcer node N 838 via communications link 874. UE AK 846 is coupled to enforcer node N 838 via communications link 876. The sensor enforcer node 826 and enforcer node 1 834 and enforcer node N 838 are located at the edge of the network 804 and act to control and protect the traffic flow into and out of the network. One or more equipment devices UE(s) 860 are coupled to enforcer node M 836 via communications link 862. The UE(s) 860 are located within the network 804 and are for example User Equipment devices of an enterprise network connected to the enforcer node M 860 with enforcer node M 860 for example being an enterprise or PBX system.

The network 804 also includes a policy server/device 824. The policy server receives policies/rules and policy updates from the threat detection and mitigation sub-system 802 and in particular from nodes executing threat detection and mitigation applications and distributes the policy/rules to the enforcement nodes and sensor enforcer nodes for enforcement by those nodes. While only a single policy server 824 has been shown, a plurality of policy servers may be, and in some embodiments are, used. For example, in some embodiments a centralized policy server is used to distribute policies to a plurality of local policy servers that in turn distribute the policies to a sub-set of the enforcement and/or sensor enforcement nodes in the network. Communications link 858 connects the device interface gateway 818 of the threat detection and mitigation sub-system 802 to the PSX policy server 824 and shows policy being sent from the sub-system 802 to the policy server 824. Communications link 848 is shown as connecting the sensor enforcer node 1 826 to the policy server 824 and the operation of the sensor enforcer node 1 performing a dip into the policy server to retrieve policies from the policy server that the sensor enforcer node 1 826 is to enforce, e.g., the policy shown as being sent down on communications link 858. The policy server 824 includes a processor and a storage device in which the policies or rules for enforcement are stored. The storage device may be for example memory or a database system.

Communications links 850, 852, 854, and 856 couple sensor enforcer node 1 826, . . . , sensor enforcer node 828, sensor 1 830, . . . , sensor L 832 to device interface gateway 818 of the threat detection and mitigation sub-system 802 respectively. These communications links are used to communicate, send or transmit data from the sensor enforcer nodes and sensors to the threat detection and mitigation protect sub-system 802 for analysis of threats and to effect actions taken to mitigate detected threats. As shown on communications link 850 the sensor data can include call data reports (CDRs). While communications links 850, 852, 854, 856, and 858 only show one-way arrows, the communications links are bi-directional and information can be exchanged in both directions.

Node 1 810, node 2 812, . . . , node N 814 when executing one or more applications for threat and anomaly detection and mitigation will process sets of traffic data including one or more pieces of data from one or more sensor or sensor enforcer devices, and detect based on the sets of traffic data sets of traffic instances that are identified as being threats to the operation of the communications system 800, e.g., threatening, for example, the operational performance and/or quality of service that can be provided to users of the communications system 800 as well as theft or fraud being attempted or perpetrated using the communication system 800. For example, node 1 810 when executing an anomaly based on KPIs detection application will process sets of traffic data including one or more pieces of data from one or more sensor or sensor enforcer devices, and detect based on KPIs obtained from the sets of traffic data anomalies which exceed a threshold level which indicate a potential or actual threat, e.g., a threat to the operation of the communications system 800 such as for example, the operational performance and/or quality of service that can be provided to users of the communications system 800.

Upon detection of one or more anomalies or threats, the system allows for a combination of automated and operator-controlled responses to the detected threat(s). While an operator is provided an opportunity to provide input on how to respond to a threat or anomaly, after one or more threats or anomalies of a given type based on KPIs inputs are identified, the system will automatically take corrective action without waiting for operator input and/or in the absence of operator input following notification of a threat. When an operator does provide input on an action to take in response to a particular type of threat or anomaly detected, the information is stored and used to implement corrective action the next time a threat or anomaly of the same type is detected without waiting for operator input. Should the operator provide input on a detected threat or anomaly and corrective action has already been taken, policy and/or actions will be updated to ensure that the operator suggested action is implemented with regard to an ongoing or new threat of the same type.

As previously discussed, the monitoring of the traffic of the system is performed off line from the call processing in near real time with only a slight delay. The monitoring in at least some cases occurs in a closed loop wherein the effect of mitigation operations to address detected threats which include traffic anomalies can be monitored and reported to an operator and additional mitigation operations can be performed until the monitoring indicates that the detected traffic threat has been addressed. More detailed aspects of various exemplary methods in accordance with the present invention will now be discussed in connection with an exemplary method 400.

Figure 4:
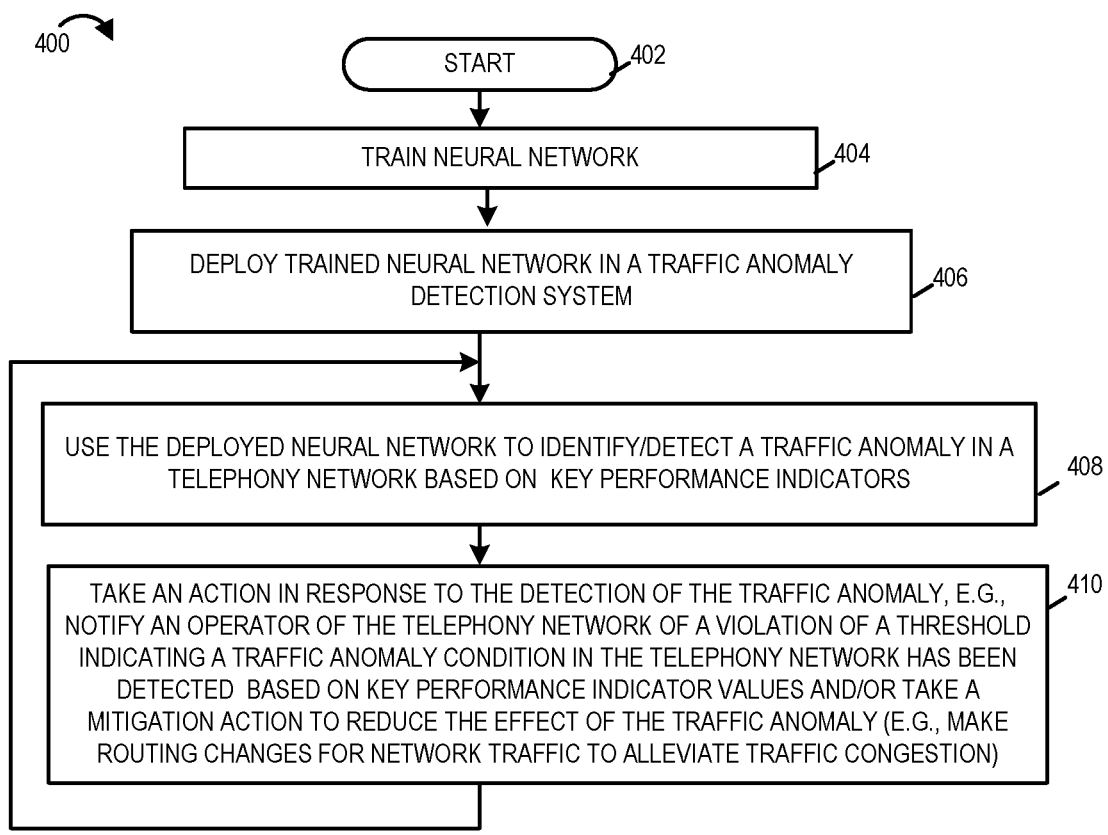
FIG. 4 illustrates an exemplary method in accordance with an embodiment of the present invention.

FIG. 4 illustrates a flowchart of an exemplary method 400 of detecting traffic anomalies in a telephony network based on key performance indicators in accordance with an embodiment of the present invention. The method 400 may be implemented on any of the exemplary systems disclosed in FIGS. 1, 2, 3, 5, 6 and/or described in the application.

Operation commences in start step 402. Operation proceeds from start step 402 to step 404.

Figure 9:
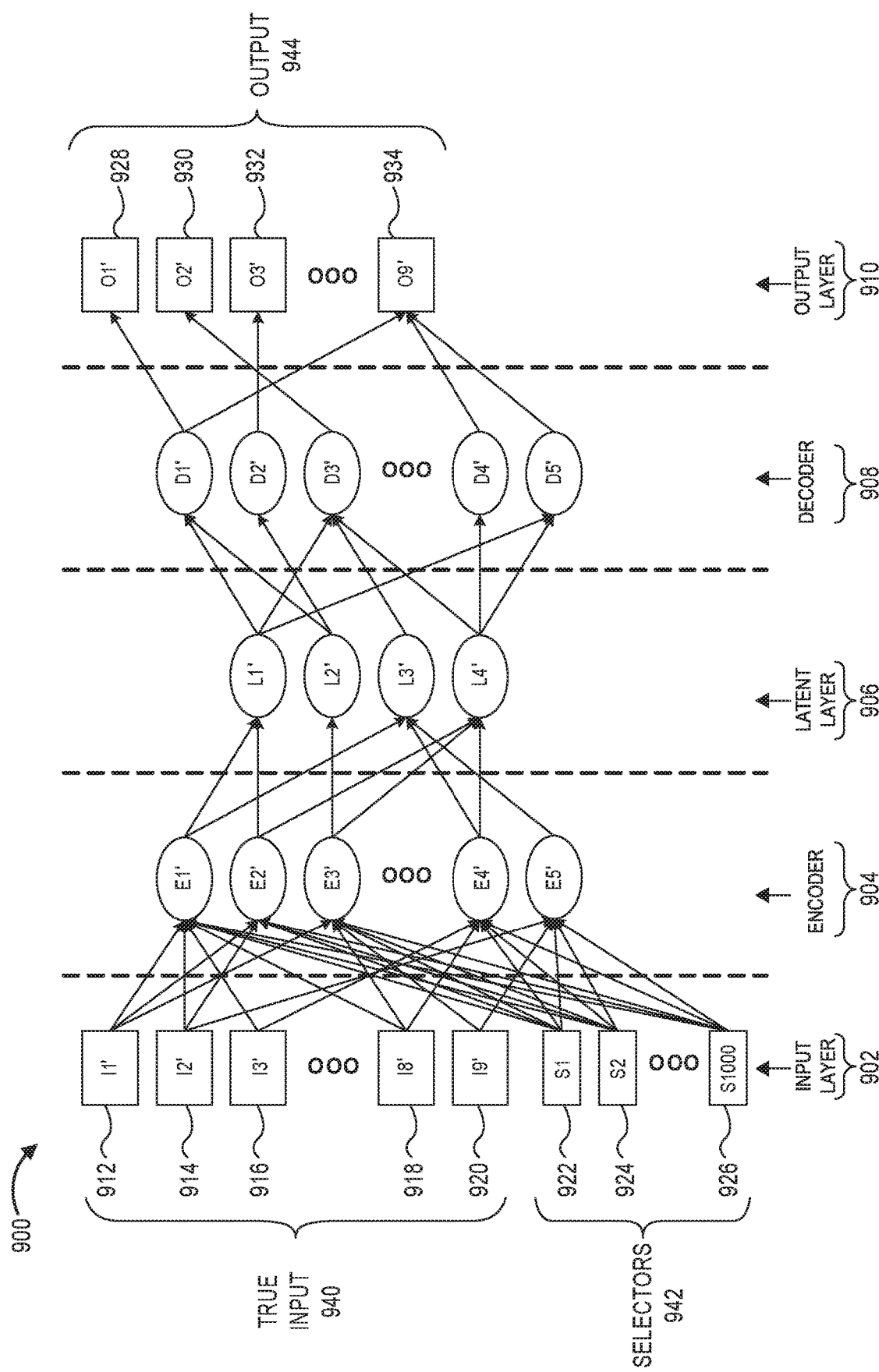
FIG. 9 illustrates an exemplary neural network in accordance with an embodiment of the present invention.
Figure 10:
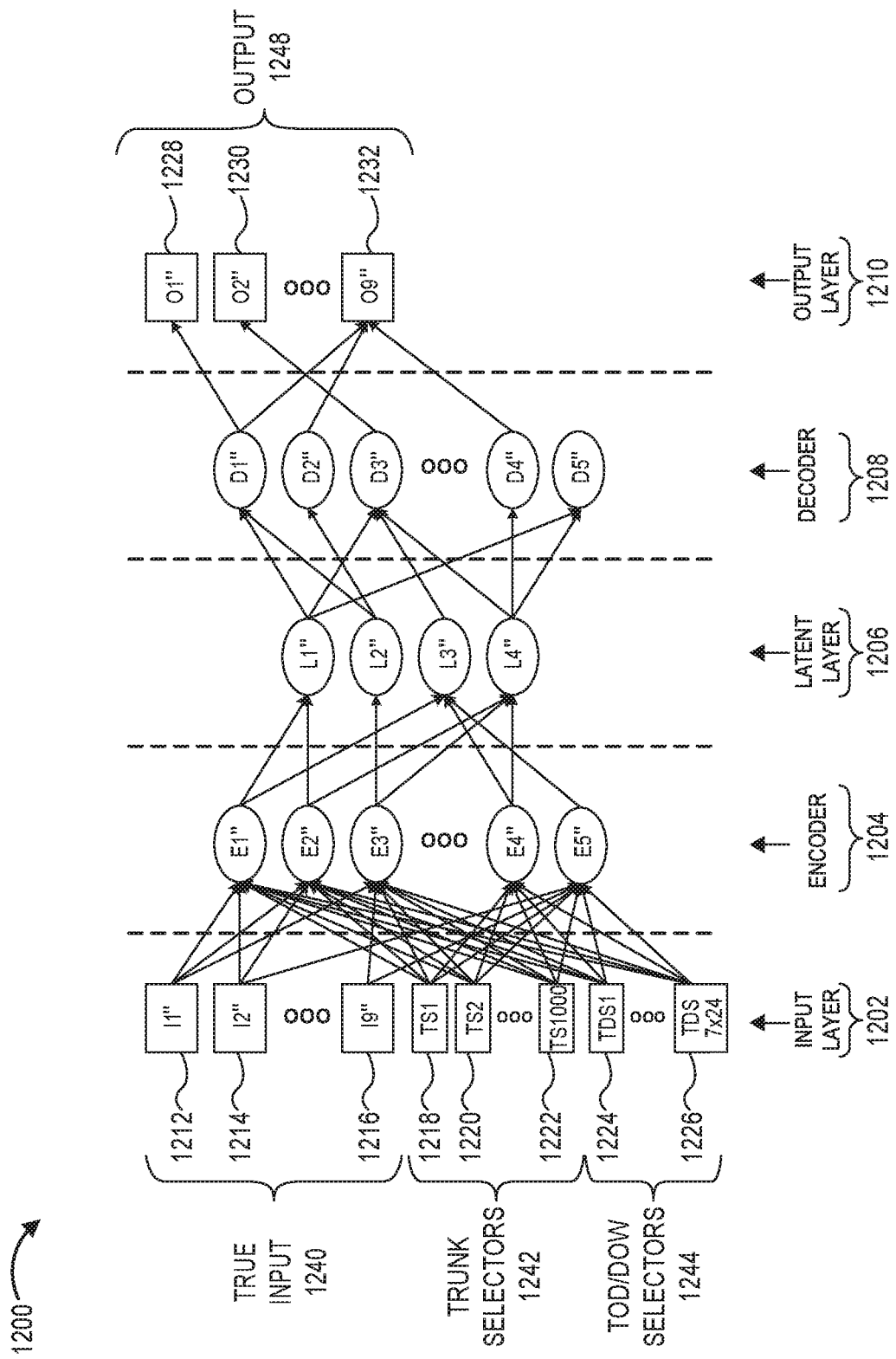
FIG. 10 illustrates another exemplary neural network in accordance with an embodiment of the present invention.

In step 404, a neural network is trained, e.g., one of the neural networks illustrated and described in connection with FIGS. 9 and 10. Operation proceeds from step 404 to step 406.

In step 406, the trained neural network is deployed in a traffic anomaly detection system that is monitoring traffic of a telephony network for anomalies based on key performance indicators, e.g., key performance indicators obtained or derived from call detail records generated by a call processing device in the telephony network such as a Session Border Controller. In some embodiments, the traffic anomaly detection system is a component of a traffic monitoring system which monitors various aspects of network traffic and operation for threats and anomalies based on a variety of different metrics and features of the network traffic and device operation within network. Operation proceeds from step 406 to step 408.

In step 408, the trained neural network is used to identify/detect a traffic anomaly in a telephony network based on key performance indicators. Operation proceeds from step 408 to step 410.

In step 410, the traffic anomaly detection system takes an action in response to the identification/detection of the traffic anomaly. For example, the traffic anomaly detection system may, and in some embodiments does, notify an operator of the telephony network that a violation of a threshold indicating a traffic anomaly condition in the telephony network has been detected based on key performance indicator values along with the presentation of the key performance indicator values. Alternatively, or in addition to notifying the operator, the traffic anomaly detection system may, and in some embodiments does, take a mitigation action to reduce the effect of the traffic anomaly (e.g., by sending call routing instructions/commands to one or more devices which will make routing changes for network traffic to alleviate traffic congestion, or sending instructions to call processing devices to block calls identified as originating from certain trunk(s) or trunk group(s) or user ID(s)).

Operation proceeds from step 410 to step 408 where implementation of the steps of the method continues with detection of the next traffic anomaly in the telephony network based on key performance indicators.

Figure 12B:
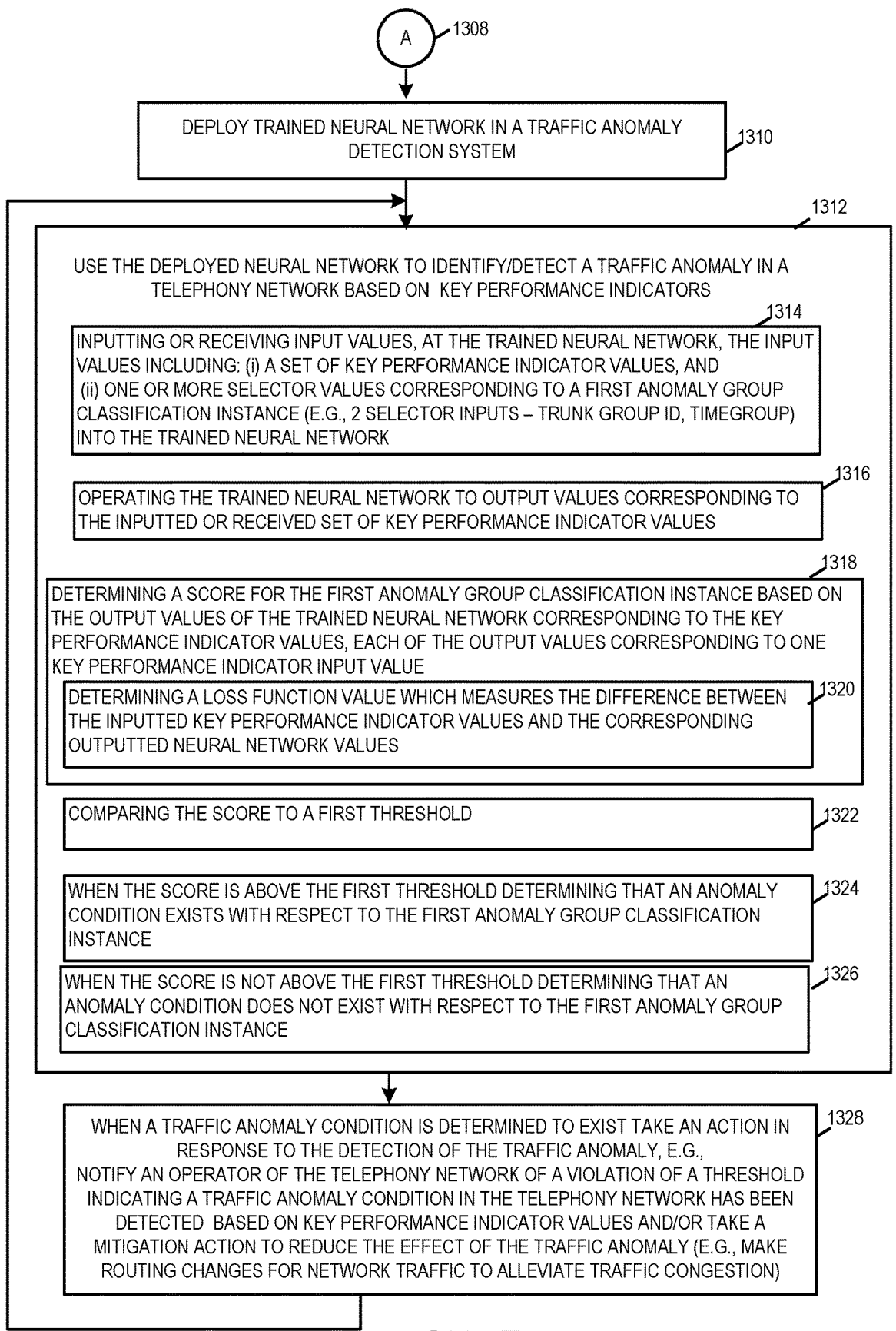
FIG. 12B illustrates a second part of a flowchart of a method in accordance with an embodiment of the present invention.

FIG. 12 comprises FIGS. 12A and 12B. FIG. 12A illustrates a first part of a flowchart of another exemplary method in accordance with an embodiment of the present invention. FIG. 12B illustrates a second part of a flowchart of another exemplary method in accordance with an embodiment of the present invention. The method 1300 may be implemented on any of the exemplary systems disclosed in FIGS. 1, 2, 3, 5, 6 and/or described in the application.

Operation commences in start step 1302 shown on FIG. 12A. Operation proceeds from start step 1302 to step 1304.

In step 1304, a neural network is implemented for example as part of a traffic anomaly detection and mitigation system and/or application. The implementation of the neural network includes determining, defining and/or configuring the neural network being implemented. Exemplary neural networks include the neural networks illustrated and described in connection with FIGS. 9 and 10. In some embodiments, step 1304 includes one or more determinations which are included in sub-step 1305. In sub-step 1305, the system determines based on for example system operator inputs, (i) a maximum input vector size for the neural network, the input vector size being the maximum number of input values that the neural network can receive for processing at a single instance; (ii) a maximum output vector size for the neural network, the output vector size being the maximum number of output values the neural network will produce, the maximum number of output values being less than the maximum number of input values; (iii) a number of first processing (e.g., encoding) layers of the neural network and a number of neural network nodes in each of the first processing layers, one of the first processing layers receiving the input values; (iv) a number of second processing (e.g., decoding) layers of the neural network and a number of neural network nodes in each of the second processing (e.g., decoding) layers, one of the second processing layers providing the output values of the neural network; (v) a number of neural network nodes in a bottleneck or latent layer of the neural network, the bottleneck or latent layer of the neural network having the fewest number of neural network nodes of any layer of the neural network containing neural network nodes, the bottleneck or latent layer receiving inputs from one of the first processing layers (e.g., encoding layers) and providing outputs to one of the second processing layers (e.g., decoding layers); (vi) a loss function for the neural network that minimizes the error between the neural network output values and a subset of the neural network input values. Operation proceeds from step 1304 to step 1306.

In step 1306, the neural network is trained to minimize the error between the outputted values corresponding to the inputted set of key performance indicator values, the neural network being a neural network including: (i) a number of neural network nodes in the bottleneck or latent layer of the neural network having the fewest number of nodes of any layer of the neural network containing neural network nodes; (ii) one or more encoding layers, each of the encoding layers containing more neural network nodes than said bottleneck or latent layer; (iii) one or more decoding layers, each of the decoding layers containing more neural network nodes than the bottleneck or latent layer; (iv) an input layer and an output layer, the input layer being larger than the output layer, the neural network outputting fewer values than are inputted. In some embodiments which include the optional sub-step 305, the one or more first processing layers are the one or more encoding layers, the one or more second processing layers are the decoding layers. Operation proceeds from step 1306 via connection node A 1308 to step 1310 shown on FIG. 12B.

In step 1310, the trained neural network is deployed in a traffic anomaly detection system. Operation proceeds from step 1310 to step 1312.

In step 1312, the deployed neural network is used to identify/detect a traffic anomaly in a telephony network based on key performance indicators. In some embodiments, step 1312 includes one or more sub-steps 1314, 1316, 1318, 1320, 1322, 1324, and 1326.

In sub-step 1314, input or receive input values, at the trained neural network, the input values including: (i) a set of key performance indicator values and (ii) one or more selector values corresponding to a first anomaly group classification instance (e.g., 2 selector inputs—trunk group ID, timegroup) into the trained neural network. Operation proceeds from sub-step 1314 to sub-step 1316.

In sub-step 1316, operate the neural network to output values corresponding to the inputted or received set of key performance indicator values. Operation proceeds from step 1316 to step 1318.

In sub-step 1318, determine a score for the first anomaly group classification instance based on the output values of the trained neural network corresponding to the key performance indicator values, each of the output values corresponding to one key performance indicator input value. In some embodiments, sub-step 1318 includes sub-step 1320. In sub-step 1320, determine a loss function value which measures the difference between the inputted key performance indicator values and the corresponding outputted neural network values. Operation proceeds from sub-step 1318 to sub-step 1322.

In sub-step 1322, compare the score to a first threshold, e.g., a first threshold value determined by the system operator. Operation proceeds from step 1322 to sub-step 1324 and sub-step 1326. In sub-step 1324, when the score is above the first threshold determine that an anomaly condition exists with respect to the first anomaly group classification instance. In sub-step 1326, when the score is not above the first threshold determine that an anomaly condition does not exist with respect to the first anomaly group classification instance. In some embodiments sub-steps 13324 and 1326 are part of sub-step 1322. Operation proceeds from step 1312 to step 1328.

In step 1328, when a traffic anomaly condition is determined to exist an action is taken in response to the detection of the traffic anomaly, e.g., notify an operator of the telephony network of a violation of a threshold indicating a traffic anomaly condition in the telephony network has been detected based on key performance indicator values and/or take a mitigation action to reduce the effect of the traffic anomaly (e.g., make one or more routing changes for network traffic to alleviate traffic congestion when the traffic anomaly indicates traffic congestion in the network). Operation proceeds from step 1328 to step 1312 wherein the method 1300 continues and the deployed neural network continues to be used to identify/detect additional traffic anomalies in the telephony network based on key performance indicators.

Various features which may be, and in some embodiments are, included when implementing the method 1300 which will now be discussed. It should be understand that not all embodiments will include all features. The neural network may be, and in some embodiments is, an autoencoder neural network. The score for the anomaly group classification instance may be, and in some embodiments is, the loss function value determined in sub-step 1320. In some embodiments, the loss function values is a reproduction error of the autoencoder neural network post-image output (i.e., the output values corresponding to the inputted key performance indicator values) indicating an amount of discrepancy between a subset of the input values and corresponding autoencoder neural network output values, the subset of the input values being smaller than the set of input values. In most embodiments, the sub-set of input values includes the key performance indicator values and does not include one or more selector values (i.e., pre-image input to the autoencoder neural network excluding the one or more selector values inputted is what is used to determine the loss function value which is used for scoring). In most embodiments, the sub-set of the input values does not include any of the selector values. In some embodiments, the loss function value is determined using a non-standard cross-entropy loss function. In some embodiments, the loss function is a non-standard loss function which does not consider the reproduction error relative to the entire set of input values but considers less than the entire set of input values or a sub-set of the input values.

In some embodiments, the first anomaly group classification instance is a trunk group during specified time period which is (trunk group ID, time period (e.g., day of week/hour of day)) and the key performance indicator values are traffic performance measurements (or metrics) corresponding to the trunk group during the specified time period.

In some embodiments, the first anomaly group classification is a two dimensional group classification, the first dimension group classification being a trunk group and the second dimension group classification being a time group, the trunk group specifying the identity of trunk group from a plurality of trunk groups (e.g., trunk group 1) and the time group specifying time period or interval (trunk group ID, time group (day of week/hour of day) and the key performance indicator values are traffic performance measurements or metrics for the identified trunk group (trunk group ID0 during the time period specified by the time group.

In some embodiments, the key performance indicators include two or more of the following: ingress and egress bids, ingress and egress connections, ingress and egress minutes of usage (MOU), number of bids, connects and MOU independent of direction.

In some embodiments, the first anomaly group classification instance is a two dimensional group classification, the first dimension group classification being one of the following group types: source, destination, subscriber, or trunk group and the second dimension group classification being a time group, the first anomaly group classification specifying the identity of the instance's group type from a plurality of such instances (e.g., source ID, destination ID, subscriber ID or trunk group ID) and the time group specifying time period or interval (trunk group ID, time group (Day of week/hour of day); and the key performance indicator values are traffic performance measurements (or metrics) for the identified group classification instance (source ID, destination ID, subscriber ID or trunk group ID) during the time period specified by the time group.

In some embodiments, the first anomaly group classification instance is an N-dimensional group classification, N being a positive integer value greater than one, the N-dimensional group classification including two or more of the following: source, destination, subscriber, trunk group, and time group.

In some embodiments, the first anomaly group classification instance is an N-dimensional group classification, N being a positive integer value greater than 1, the N dimensional group classification including a time group classification and one or more of the following dimension group classifications: source, destination, subscriber, trunk group, the first anomaly group classification specifying the identity of the instance of the one or more group types from a plurality of such instances (e.g., source ID, destination ID, subscriber ID or trunk group ID) and the time group specifying time period or interval (trunk group ID, time group (Day of week/hour of day)); and wherein said key performance indicator values are traffic performance measurements (or metrics) for the identified one or more group classification instances (source ID, destination ID, subscriber ID or trunk group ID) during the time period specified by the time group.

In most embodiments, the neural network is trained with a training dataset of unlabeled Key Performance Indicator data. In some embodiments, the unlabeled Key Performance Indicator training data of the training dataset does not include an indication of which Key Performance Indicator training data is good and which is bad.

In some embodiments, the amount of the Key Performance Indicator training data above a first threshold (e.g., 95%) represents normal expected Key Performance Indicator sample values. In some embodiments, the first threshold is 95% of the total amount of training data in the training set.

In some embodiments, one or more of the inputted selector values do not produce any change in the output values (i.e., some values of the selector variables are ignored by the trained neural network).

In some embodiments, the input and output values are numerical values (e.g., floating point values between 0 and 1 or between −1 and 1).

In some embodiments, in response to determining that an anomaly condition exists with respect to the first anomaly group classification instance a notification of the detection of the anomaly condition is sent to a threat incident detection and/or mitigation system or application. In some embodiments, the notification is also sent to an operator of the system, e.g., via an automated e-mail, text, and/or voice message which may include information about the anomaly detected such as for example, the type of anomaly, its severity, how long the anomaly has been present and/or identification of how the network is being affected as well as potential mitigation actions which have been taken or which may be taken or recommended.

In some embodiments, the neural network is an autoencoder neural network in which the number of inputs and outputs is the same but the neural network has been trained to minimize the reproduction loss between a sub-set of the inputs and a corresponding sub-set of the outputs. For example, inputs may include a first sub-set of true inputs which are KPI values and a second sub-set of selector inputs. The neural network may output values corresponding to each input value (both true inputs and selector inputs) but the neural network is trained to minimize the loss value between the true inputs and the outputs corresponding to the true inputs while ignoring the output values corresponding to the selector inputs.

In some embodiments, a mitigation action is automatically taken based on the severity of anomaly condition detected. The mitigation action may be, and in some embodiments is, enforcement or routing policies distributed to enforcement nodes and/or sensor/enforcer nodes in the telephony network that when implemented by the enforcement nodes and/or sensor/enforcer nodes will mitigate the affect of the anomaly condition detected.

FIG. 7 as discussed above is a drawing illustrating an assembly of components 700 which may be included in an exemplary computing node or device 600 when implemented as a node or device executing an application for threat detection and mitigation, e.g., nodes 1 810 , 2 812, . . . , N 814 of FIG. 8 implemented in accordance with exemplary embodiment component 600. Assembly of components 700 can be, and in some embodiments is, used in computing node 600. The components in the assembly of components 700 can, and in some embodiments are, implemented fully in hardware within the processor 606, e.g., as individual circuits. The components in the assembly of components 700 can, and in some embodiments are, implemented fully in hardware within the assembly of components 619, e.g., as individual circuits corresponding to the different components. In other embodiments some of the components are implemented, e.g., as circuits, within the processor 606 with other components being implemented, e.g., as circuits within assembly of components 619, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 610 of the computing node 600, with the components controlling operation of computing node 600 to implement the functions corresponding to the components when the components are executed by a processor, e.g., processor 606. In some such embodiments, the assembly of components 700 is included in the memory 610 as assembly of components 618. In still other embodiments, various components in assembly of components 700 are implemented as a combination of hardware and software, e.g., with another circuit external to the processor providing input to the processor 606 which then under software control operates to perform a portion of a component's function. While shown in the FIG. 6 embodiment as a single processor, e.g., computer, it should be appreciated that the processor 606 may be implemented as one or more processors, e.g., computers.

When implemented in software the components include code which, when executed by the processor 606, configures the processor 606 to implement the function corresponding to the component. In embodiments where the assembly of components 700 is stored in the memory 610, the memory 610 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the computing node or device 600 or elements therein such as the processor 606, to perform the functions of corresponding steps illustrated and/or described in the method of flowchart of FIG. 4 and/or described with respect to any of the Figures or described in the specification or claims. Thus, the assembly of components 700 includes various components that perform functions of corresponding steps of FIG. 4.

Assembly of components 700 includes components 702, 704, 706, 708, 710, 712, 714, 716, 718, 720, 722, 724, 726, and 728.

The control routines component 702 is configured to control the operation of the node or device.

The communications component 704 is configured to provide communications functionality including communications signaling and support for various communications protocols and interfaces.

The training component 706 is configured to train a neural network for use in detecting KPI based traffic anomalies.

The configuration component 708 is configured to configure the neural network, e.g., before the neural network is trained.

The neural network component 710 is a neural network that is used for detecting traffic anomalies based on KPIs.

The neural network determination component 712 is configured to make determinations regarding parameters for a neural network including: vector input size, output vector size, number and type of layers, weights of links, number of neural network nodes per layer, loss function to be used. The neural network determination component 712 may, and in some embodiments does, make these determinations based on inputs received from a user or operator of the system.

The loss function component 714 is a function implemented to determine the reproduction error between output values of a neural network and a sub-set of inputs to a neural network, e.g., the reproduction of a sub-set of inputs corresponding to KPI input values referred to as "true inputs" while excluding the sub-set of inputs corresponding to selectors, the total set of inputs comprising the sub-set of KPI inputs and sub-set of selector inputs.

The database storage component 716 is configured to access, retrieve, store and delete information in databases.

The generator of Key Performance Indicators component 718 generates KPIs from traffic data such as CDRs from SBCs, e.g., KPIs for input into a neural network for evaluation.

The call detail record (CDR) processing component 720 processes call detail records, e.g., to parse the records to obtain data from which key performance indicator values can be generated and/or to generate the KPI values.

The comparator component 722 compares a score to a first threshold.

The determinator component 724 makes determinations needed by the node including for example, determination of a score for a first anomaly group classification instance based on output values from the trained neural network corresponding to key performance indicator values.

The notifier component 726 is configured to provide notifications of status of traffic anomalies, e.g., notifications of KPI violations and/or status and effect of anomaly mitigation operation which have been undertaken.

The mitigation operation component 728 takes mitigation actions such as sending instructions/commands or policy updates to enforcement devices and/or sensor enforcer devices to implement policy changes to mitigate detected anomalies and/or threats such as, for example, blocking traffic from an endpoint or implementing traffic routing changes to alleviate network traffic congestion.

Listing of Exemplary Numbered Method Embodiments

Method Embodiment 1. A method of operating a system to detect traffic anomalies comprising: inputting input values, said input values including i) a set of key performance indicator values and ii) one or more selector values corresponding to a first anomaly group classification instance (e.g., 2 selector inputs—trunk group ID, timegroup) into a trained neural network; operating the trained neural network to output values corresponding to the inputted set of key performance indicator values; determining a score for the first anomaly group classification instance based on the output values of the trained neural network corresponding to the key performance indicator values, each of said output values corresponding to one key performance indicator input value; comparing the score to a first threshold; and when said score is above a first threshold determining that an anomaly condition exists with respect to the first anomaly group classification instance.

Method Embodiment 1A. The method of method embodiment 1, wherein said trained neural network is an autoencoder neural network trained to minimize the error between the outputted values corresponding to the inputted set of key performance indicator values, said autoencoder neural network being a neural network including: i) a number of neural network nodes in a bottleneck layer of the neural network, said bottleneck layer of the neural network having the fewest number of nodes of any layer of the neural network containing neural network nodes; ii) one or more encoding layers, each of said encoding layers containing more neural network nodes than said bottleneck layer; and (iii) one or more decoding layers, each of said decoding layers containing more neural network nodes than said bottleneck layer.

Method Embodiment 1B. The method of method embodiment 1A, wherein said autoencoder neural network has an input layer and an output layer, said input layer being larger than said output layer, said autoencoder neural network outputting fewer values than are inputted.

Method Embodiment 1C. The method of method embodiment 1, wherein said neural network includes: an input layer which receives the input values; an output layer from which the neural network output values are outputted; a bottleneck layer including a plurality of neural network nodes, said bottleneck layer having the fewest neural network nodes of any layer in the neural network containing neural network nodes, said bottleneck layer receiving inputs from a first neural network layer containing more neural network nodes than said bottleneck layer, said bottleneck layer providing outputs to a second neural network layer containing more neural network nodes than said bottleneck layer; and wherein said neural network minimizes the error between the neural network output values and a subset of the input values.

Method Embodiment 1D. The method of method embodiment 1 further comprising: prior to training the neural network determining: (i) a maximum input vector size for the neural network, said input vector size being the maximum number of input values that the neural network can receive for processing at a single instance; (ii) a maximum output vector size for the neural network, said output vector size being the maximum number of output values the neural network will produce, said maximum number of output values being less than said maximum number of input values; (iii) a number of first processing (e.g., encoding) layers of the neural network and a number of neural network nodes in each of said first processing layers, one of said first processing layers receiving said input values; (iv) a number of second processing (e.g., decoding) layers of the neural network and a number of neural network nodes in each of said second processing layers (e.g., decoding layers), one of said second processing layers providing said output values of the neural network; (v) a number of neural network nodes in a bottleneck layer of the neural network, said bottleneck layer of the neural network having the fewest number of neural network nodes of any layer of the neural network containing neural network nodes, said bottleneck layer receiving inputs from one of said first processing layers (e.g., encoding layers) and providing outputs to one of said second processing layers (e.g., decoding layers); (vi) a loss function for the neural network that minimizes the error between the neural network output values and a subset of the neural network input values.

Method Embodiment 1E. The method of method embodiment 1 further comprising: prior to training the neural network determining: (i) a maximum input vector size for the neural network, said input vector size being the maximum number of input values that the neural network can receive for processing at a single instance; (ii) a maximum output vector size for the neural network, said output vector size being the maximum number of output values the neural network will produce, said maximum number of output values being less than said maximum number of input values; (iii) a number of neural network nodes in a bottleneck layer of the neural network, said bottleneck layer of the neural network having the fewest number of neural network nodes of any layer of the neural network containing neural network nodes; (iv) a number of processing (e.g., encoding) layers of the neural network and the number of neural network nodes in each of said processing layers; (v) a number of processing (e.g., decoding) layers of the neural network and the number of neural network nodes in each of said decoding layers; (vi) a loss function for the neural network that minimizes the error between the neural network output values and a subset of the input values.

Method Embodiment 2. The method of method embodiment 1 further comprising: when said score is at or below said first threshold determining that an anomaly condition does not exist with respect to the first anomaly group classification instance.

Method Embodiment 3. The method of method embodiment 2 wherein determining a score for the first anomaly group classification instance based on the output values of the trained autoencoder neural network includes determining a loss function value which measures the difference between the inputted key performance indicator values and the corresponding autoencoder neural network values.

Method Embodiment 4. The method of method embodiment 3, wherein said score for the anomaly group classification instance is the determined loss function value.

Method Embodiment 5. The method of method embodiment 4, wherein said loss function value is a reproduction error of the autoencoder neural network post-image output (i.e., output values corresponding to the inputted key performance indicator values) indicating an amount of discrepancy between a subset of the input values and corresponding autoencoder neural network output values, said subset of the input values being smaller than the set of input values.

Method Embodiment 5A. The method of method embodiment 5, wherein said subset of the input values includes the key performance indicator values.

Method Embodiment 5B. The method of method embodiment 5A, wherein said subset of the input values does not include one or more of the selector values (i.e., pre-image input to the autoencoder neural network excluding the one or more selector values inputted is what is used for reproduction scoring purposes in some embodiments).

Method Embodiment 5C. The method of method embodiment 5B, wherein said subset of the input values does not include any of the selector values.

Method Embodiment 6. The method of method embodiment 3, wherein said loss function value is determined using a non-standard cross-entropy loss function.

Method Embodiment 6A. The method of method embodiment 3, wherein the said loss function is a non-standard loss function which does not consider the reproduction error relative to the entire set of input values but considers less than the entire set of input values or a sub-set of the input values.

Method Embodiment 7. The method of method embodiment 4, wherein said first anomaly group classification instance is a trunk group during a specified time period which is (trunk group ID, time period (Day of week/hour of day); and wherein said key performance indicator values are traffic performance measurements (or metrics) corresponding to the trunk group during the specified time period.

Method Embodiment 8. The method of method embodiment 4, wherein said first anomaly group classification instance is a two dimensional group classification, the first dimension group classification being a trunk group and the second dimension group classification being a time group, the trunk group specifying the identity of the trunk group from a plurality of trunk groups (e.g., trunk group 1) and the time group specifying time period or interval (trunk group ID, time group (Day of week/hour of day); and wherein said key performance indicator values are traffic performance measurements (or metrics) for the identified trunk group (trunk group ID) during the time period specified by the time group.

Method Embodiment 9. The method of method embodiment 8, wherein the key performance indicators include two or more of the following: ingress and egress bids, ingress and egress connections, ingress and egress minutes of usage (MOU), number of bids, connects and MOU independent of direction.

Method Embodiment 10. The method of method embodiment 1, wherein said first anomaly group classification instance is a two dimensional group classification, the first dimension group classification being one of the following group types: source, destination, subscriber, or trunk group and the second dimension group classification being a time group, the first anomaly group classification specifying the identity of the instance's group type from a plurality of such instances (e.g., source ID, destination ID, subscriber ID or trunk group ID) and the time group specifying time period or interval (trunk group ID, time group (Day of week/hour of day); and wherein said key performance indicator values are traffic performance measurements (or metrics) for the identified group classification instance (source ID, destination ID, subscriber ID or trunk group ID) during the time period specified by the time group.

Method Embodiment 11. The method of method embodiment 1, wherein said first anomaly group classification instance is an N-dimensional group classification, N being a positive integer value greater than one, the N-dimensional group classification including two or more of the following: source, destination, subscriber, trunk group, and time group.

Method Embodiment 12. The method of method embodiment 1, wherein said first anomaly group classification instance is an N-dimensional group classification, N being a positive integer value greater than 1, the N dimensional group classification including a time group classification and one or more of the following dimension group classifications: source, destination, subscriber, trunk group, the first anomaly group classification specifying the identity of the instance of the one or more group types from a plurality of such instances (e.g., source ID, destination ID, subscriber ID or trunk group ID) and the time group specifying time period or interval (trunk group ID, time group (Day of week/hour of day)); and wherein said key performance indicator values are traffic performance measurements (or metrics) for the identified one or more group classification instances (source ID, destination ID, subscriber ID or trunk group ID) during the time period specified by the time group.

Method Embodiment 13. A method of operating a system to detect traffic anomalies comprising: inputting input values, said input values including i) a set of key performance indicator values and ii) one or more selector values corresponding to a first anomaly group classification instance (e.g., 2 selector inputs—trunk group ID, timegroup) into a trained neural network; operating the trained neural network to output values corresponding to a subset of the inputted values; determining a score for the first anomaly group classification instance based on one or more of the output values of the trained neural network, said one or more output values corresponding to one or more of the key performance indicator values included in the set of key performance indicator values; comparing the score to a first threshold; and when said score is above a first threshold determining that an anomaly condition exists with respect to the first anomaly group classification instance.

Method Embodiment 14. The method of method embodiment 13, wherein said trained neural network includes: an input layer for receiving the input values; an output layer which contains the computed output values, said output layer being smaller than said input layer (i.e., there are fewer output values than input values); at least three neural network layers including neural network nodes, said at least three neural network layers including neural network nodes including a first neural network processing layer, a second neural network processing layer, and a bottleneck layer, said bottleneck layer having the fewest nodes of any neural network layer of the neural network containing neural network nodes, said bottleneck layer receiving inputs from said first processing neural network layer and providing outputs to said second neural network layer; said neural network having been trained to minimize the error between the output values and a subset of the input values.

Method Embodiment 15. The method of method embodiment 1 or method embodiment 13 wherein the neural network is trained with a training dataset of unlabeled Key Performance Indicator data.

Method Embodiment 16. The method of method embodiment 15 wherein the unlabeled Key Performance Indicator training data of the training dataset does not include an indication of which Key Performance Indicator training data is good and which is bad.

Method Embodiment 17. The method of method embodiment 15 wherein an amount of the Key Performance Indicator training data above a first threshold (e.g., 95%) represents normal expected Key Performance Indicator sample values.

Method Embodiment 18. The method of method embodiment 17 wherein the first threshold is 95% of the total amount of training data in the training set.

Method Embodiment 19. The method of method embodiments 1 or 13, wherein one or more of the inputted selector values do not produce any change in the output values (i.e., some values of the selector variables are ignored by the trained neural network).

Method Embodiment 20. The method of method embodiments 1 or 13, wherein the input and output values are numerical values (e.g., floating point values between 0 and 1 or between −1 and 1).

Method Embodiment 20A. The method of method embodiment 20 further comprising: in response to determining that an anomaly condition exists with respect to the first anomaly group classification instance sending a notification of the detection of the anomaly condition.

Method Embodiment 20B. The method of method embodiment 20A further comprising: taking a mitigation action in response to detection of the anomaly condition.

Method Embodiment 21. The method of method embodiment 13 further comprising: when said score is at or below said first threshold determining that an anomaly condition does not exist with respect to the first anomaly group classification instance.

Method Embodiment 22. The method of method embodiment 21 wherein determining a score for the first anomaly group classification instance based on the output values of the trained autoencoder neural network includes determining a loss function value which measures the difference between the inputted key performance indicator values and the corresponding autoencoder neural network values.

Method Embodiment 23. The method of method embodiment 22, wherein said score for the anomaly group classification instance is the determined loss function value.

Method Embodiment 24. The method of method embodiment 23, wherein said loss function value is a reproduction error of the autoencoder neural network post-image output (i.e., output values corresponding to the inputted key performance indicator values) indicating an amount of discrepancy between a subset of the input values and corresponding autoencoder neural network output values, said subset of the input values being smaller than the set of input values.

Method Embodiment 24A. The method of method embodiment 24, wherein said subset of the input values includes the key performance indicator values.

Method Embodiment 24B. The method of method embodiment 24A, wherein said subset of the input values does not include one or more of the selector values (i.e., pre-image input to the autoencoder neural network excluding the one or more selector values inputted is what is used for reproduction scoring purposes in some embodiments).

Method Embodiment 24C. The method of method embodiment 24B, wherein said subset of the input values does not include any of the selector values.

Method Embodiment 25. The method of method embodiment 22, wherein said loss function value is determined using a non-standard cross-entropy loss function.

Method Embodiment 25A. The method of method embodiment 22, wherein the said loss function is a non-standard loss function which does not consider the reproduction error relative to the entire set of input values but considers less than the entire set of input values or a sub-set of the input values.

Method Embodiment 26. The method of method embodiment 23, wherein said first anomaly group classification instance is a trunk group during a specified time period which is (trunk group ID, time period (Day of week/hour of day); and wherein said key performance indicator values are traffic performance measurements (or metrics) corresponding to the trunk group during the specified time period.

Method Embodiment 27. The method of method embodiment 23, wherein said first anomaly group classification instance is a two dimensional group classification, the first dimension group classification being a trunk group and the second dimension group classification being a time group, the trunk group specifying the identity of the trunk group from a plurality of trunk groups (e.g., trunk group 1) and the time group specifying time period or interval (trunk group ID, time group (Day of week/hour of day); and wherein said key performance indicator values are traffic performance measurements (or metrics) for the identified trunk group (trunk group ID) during the time period specified by the time group.

Method Embodiment 28. The method of method embodiment 27 wherein the key performance indicators include two or more of the following: ingress and egress bids, ingress and egress connections, ingress and egress minutes of usage (MOU), number of bids, connects and MOU independent of direction.

Method Embodiment 29. The method of method embodiment 13, wherein said first anomaly group classification instance is a two dimensional group classification, the first dimension group classification being one of the following group types: source, destination, subscriber, or trunk group and the second dimension group classification being a time group, the first anomaly group classification specifying the identity of the instance's group type from a plurality of such instances (e.g., source ID, destination ID, subscriber ID or trunk group ID) and the time group specifying time period or interval (trunk group ID, time group (Day of week/hour of day); and wherein said key performance indicator values are traffic performance measurements (or metrics) for the identified group classification instance (source ID, destination ID, subscriber ID or trunk group ID) during the time period specified by the time group.

Method Embodiment 30. The method of method embodiment 13, wherein said first anomaly group classification instance is an N-dimensional group classification, N being a positive integer value greater than one, the N-dimensional group classification including two or more of the following: source, destination, subscriber, trunk group, and time group.

Method Embodiment 31. The method of method embodiment 13, wherein said first anomaly group classification instance is an N-dimensional group classification, N being a positive integer value greater than 1, the N dimensional group classification including a time group classification and one or more of the following dimension group classifications: source, destination, subscriber, trunk group, the first anomaly group classification specifying the identity of the instance of the one or more group types from a plurality of such instances (e.g., source ID, destination ID, subscriber ID or trunk group ID) and the time group specifying time period or interval (trunk group ID, time group (Day of week/hour of day)); and wherein said key performance indicator values are traffic performance measurements (or metrics) for the identified one or more group classification instances (source ID, destination ID, subscriber ID or trunk group ID) during the time period specified by the time group.

Listing of Exemplary Numbered System and Apparatus Embodiments

System Embodiment 1. A system to detect traffic anomalies comprising: a trained neural network; and a processor, said processor being configured to control the operations of the system to: input (e.g., load) into the trained neural network input values, said input values including: i) a set of key performance indicator values and ii) one or more selector values corresponding to a first anomaly group classification instance (e.g., 2 selector inputs—trunk group ID, timegroup); operate the trained neural network to output values corresponding to the inputted set of key performance indicator values; determine a score for the first anomaly group classification instance based on the output values of the trained neural network corresponding to the key performance indicator values, each of said output values corresponding to one key performance indicator input value; compare the score to a first threshold; and when said score is above a first threshold determining that an anomaly condition exists with respect to the first anomaly group classification instance.

System Embodiment 1A. The system of system embodiment 1, wherein said trained neural network is an autoencoder neural network trained to minimize the error between the outputted values corresponding to the inputted set of key performance indicator values, said autoencoder neural network being a neural network including: i) a number of neural network nodes in a bottleneck layer of the neural network, said bottleneck layer of the neural network having the fewest number of nodes of any layer of the neural network containing neural network nodes; ii) one or more encoding layers, each of said encoding layers containing more neural network nodes than said bottleneck layer; and (iii) one or more decoding layers, each of said decoding layers containing more neural network nodes than said bottleneck layer.

System Embodiment 1B. The system of system embodiment 1A, wherein said autoencoder neural network has an input layer and an output layer, said input layer being larger than said output layer, said autoencoder neural network outputting fewer values than are inputted.

System Embodiment 1C. The system of system embodiment 1, wherein said neural network includes: an input layer which receives the input values; an output layer from which the neural network output values are outputted; a bottleneck layer including a plurality of neural network nodes, said bottleneck layer having the fewest neural network nodes of any layer in the neural network containing neural network nodes, said bottleneck layer receiving inputs from a first neural network layer containing more neural network nodes than said bottleneck layer, said bottleneck layer providing outputs to a second neural network layer containing more neural network nodes than said bottleneck layer; and wherein said neural network minimizes the error between the neural network output values and a subset of the input values.

System Embodiment 1D. The system of system embodiment 1, wherein said processor further controls the operation of the system prior to training the neural network to configure the neural network to have: (i) a maximum input vector size for the neural network, said input vector size being the maximum number of input values that the neural network can receive for processing at a single instance; (ii) a maximum output vector size for the neural network, said output vector size being the maximum number of output values the neural network will produce, said maximum number of output values being less than said maximum number of input values; (iii) a number of first processing (e.g., encoding) layers of the neural network and a number of neural network nodes in each of said first processing layers, one of said first processing layers receiving said input values; (iv) a number of second processing (e.g., decoding)

layers of the neural network and a number of neural network nodes in each of said second processing layers (e.g., decoding layers), one of said second processing layers providing said output values of the neural network; (v) a number of neural network nodes in a bottleneck layer of the neural network, said bottleneck layer of the neural network having the fewest number of neural network nodes of any layer of the neural network containing neural network nodes, said bottleneck layer receiving inputs from one of said first processing layers (e.g., encoding layers) and providing outputs to one of said second processing layers (e.g., decoding layers); (vi) a loss function for the neural network that minimizes the error between the neural network output values and a subset of the neural network input values.

System Embodiment 1D1. The system of system embodiment 1D, wherein said operation to configure the neural network includes determining for the neural network: (i) a maximum input vector size for the neural network, said input vector size being the maximum number of input values that the neural network can receive for processing at a single instance; (ii) a maximum output vector size for the neural network, said output vector size being the maximum number of output values the neural network will produce, said maximum number of output values being less than said maximum number of input values; (iii) a number of first processing (e.g., encoding) layers of the neural network and a number of neural network nodes in each of said first processing layers, one of said first processing layers receiving said input values; (iv) a number of second processing (e.g., decoding) layers of the neural network and a number of neural network nodes in each of said second processing layers (e.g., decoding layers), one of said second processing layers providing said output values of the neural network; (v) a number of neural network nodes in a bottleneck layer of the neural network, said bottleneck layer of the neural network having the fewest number of neural network nodes of any layer of the neural network containing neural network nodes, said bottleneck layer receiving inputs from one of said first processing layers (e.g., encoding layers) and providing outputs to one of said second processing layers (e.g., decoding layers); (vi) a loss function for the neural network that minimizes the error between the neural network output values and a subset of the neural network input values.

System Embodiment 1E. The system of system embodiment 1, wherein prior to training the neural network the processor controls the operation of the system to configure the neural network to have: (i) a maximum input vector size for the neural network, said input vector size being the maximum number of input values that the neural network can receive for processing at a single instance; (ii) a maximum output vector size for the neural network, said output vector size being the maximum number of output values the neural network will produce, said maximum number of output values being less than said maximum number of input values; (iii) a number of neural network nodes in a bottleneck layer of the neural network, said bottleneck layer of the neural network having the fewest number of neural network nodes of any layer of the neural network containing neural network nodes; (iv) a number of processing (e.g., encoding) layers of the neural network and the number of neural network nodes in each of said processing layers; (v) a number of processing (e.g., decoding) layers of the neural network and the number of neural network nodes in each of said decoding layers; (vi) a loss function for the neural network that minimizes the error between the neural network output values and a subset of the input values.

System Embodiment 2. The system of system embodiment 1, wherein when said determined score is at or below said first threshold, said system is controlled by said processor to determine that an anomaly condition does not exist with respect to the first anomaly group classification instance.

System Embodiment 3. The system of system embodiment 2 wherein the operation to determine a score for the first anomaly group classification instance based on the output values of the trained autoencoder neural network includes determining a loss function value which measures the difference between the inputted key performance indicator values and the corresponding autoencoder neural network values.

System Embodiment 4. The system of system embodiment 3, wherein said score for the first anomaly group classification instance is the determined loss function value.

System Embodiment 5. The system of system embodiment 4, wherein said loss function value is a reproduction error of the autoencoder neural network post-image output (i.e., output values corresponding to the inputted key performance indicator values) indicating an amount of discrepancy between a subset of the input values and corresponding autoencoder neural network output values, said subset of the input values being smaller than the set of input values.

System Embodiment 5A. The system of system embodiment claim 5, wherein said subset of the input values includes the key performance indicator values.

System Embodiment 5B. The system of claim 5A, wherein said subset of the input values does not include one or more of the selector values (i.e., pre-image input to the autoencoder neural network excluding the one or more selector values inputted is what is used for reproduction scoring purposes in some embodiments).

System Embodiment 5C. The system of system embodiment 5B, wherein said subset of the input values does not include any of the selector values.

System Embodiment 6. The system of claim 3, wherein said loss function value is determined using a non-standard cross-entropy loss function.

System Embodiment 6A. The system of system embodiment 3, wherein the said loss function is a non-standard loss function which does not consider the reproduction error relative to the entire set of input values but considers less than the entire set of input values or a sub-set of the input values.

System Embodiment 7. The system of system embodiment 4, wherein said first anomaly group classification instance is a trunk group during a specified time period which is (trunk group ID, time period (Day of week/hour of day); and wherein said key performance indicator values are traffic performance measurements (or metrics) corresponding to the trunk group during the specified time period.

System Embodiment 8. The system of system embodiment 4, wherein said first anomaly group classification instance is a two dimensional group classification, the first dimension group classification being a trunk group and the second dimension group classification being a time group, the trunk group specifying the identity of the trunk group from a plurality of trunk groups (e.g., trunk group 1) and the time group specifying time period or interval (trunk group ID, time group (Day of week/hour of day); and wherein said key performance indicator values are traffic performance measurements (or metrics) for the identified trunk group (trunk group ID) during the time period specified by the time group.

System Embodiment 9. The system of system embodiment 8 wherein the key performance indicators include two or more of the following: ingress and egress bids, ingress and egress connections, ingress and egress minutes of usage (MOU), number of bids, connects and MOU independent of direction.

System Embodiment 10. The system of system embodiment 1, wherein said first anomaly group classification instance is a two dimensional group classification, the first dimension group classification being one of the following group types: source, destination, subscriber, or trunk group and the second dimension group classification being a time group, the first anomaly group classification specifying the identity of the instance's group type from a plurality of such instances (e.g., source ID, destination ID, subscriber ID or trunk group ID) and the time group specifying time period or interval (trunk group ID, time group (Day of week/hour of day); and wherein said key performance indicator values are traffic performance measurements (or metrics) for the identified group classification instance (source ID, destination ID, subscriber ID or trunk group ID) during the time period specified by the time group.

System Embodiment 11. The system of system embodiment 1 wherein said first anomaly group classification instance is an N-dimensional group classification, N being a positive integer value greater than one, the N-dimensional group classification including two or more of the following: source, destination, subscriber, trunk group, and time group.

System Embodiment 12. The system of system embodiment 1, wherein said first anomaly group classification instance is an N-dimensional group classification, N being a positive integer value greater than 1, the N dimensional group classification including a time group classification and one or more of the following dimension group classifications: source, destination, subscriber, trunk group, the first anomaly group classification specifying the identity of the instance's of the one or more group types from a plurality of such instances (e.g., source ID, destination ID, subscriber ID or trunk group ID) and the time group specifying time period or interval (trunk group ID, time group (Day of week/hour of day)); and wherein said key performance indicator values are traffic performance measurements (or metrics) for the identified one or more group classification instances (source ID, destination ID, subscriber ID or trunk group ID) during the time period specified by the time group.

System Embodiment 13. A system to detect traffic anomalies comprising: a trained neural network, and a processor, said processor being configured to control the operation of the system to: input into the trained neural network input values, said input values including: i) a set of key performance indicator values and ii) one or more selector values corresponding to a first anomaly group classification instance (e.g., 2 selector inputs—trunk group ID, timegroup); operate the trained neural network to output values corresponding to a subset of the inputted values; determine a score for the first anomaly group classification instance based on one or more of the output values of the trained neural network, said one or more output values corresponding to one or more of the key performance indicator values included in the set of key performance indicator values; compare the score to a first threshold; and when said score is above a first threshold determine that an anomaly condition exists with respect to the first anomaly group classification instance.

System Embodiment 14. The system of system embodiment 13, wherein said trained neural network includes: an input layer for receiving the input values; an output layer which contains the computed output values, said output layer being smaller than said input layer (i.e., there are fewer output values than input values); at least three neural network layers including neural network nodes, said at least three neural network layers including neural network nodes including a first neural network processing layer, a second neural network processing layer, and a bottleneck layer, said bottleneck layer having the fewest nodes of any neural network layer of the neural network containing neural network nodes, said bottleneck layer receiving inputs from said first processing neural network layer and providing outputs to said second neural network layer; and wherein said neural network is trained to minimize the error between the output values and a subset of the input values.

System Embodiment 15. The system of system embodiment 1 or claim 13 wherein the neural network is trained with a training dataset of unlabeled Key Performance Indictor data.

System Embodiment 16. The system of system embodiment 15 wherein the unlabeled Key Performance Indicator training data of the training dataset does not include an indication of which Key Performance Indicator training data is good and which is bad.

System Embodiment 17. The system of system embodiment 15 wherein an amount of the Key Performance Indicator training data above a first threshold (e.g., 95%) represents normal expected Key Performance Indicator sample values.

System Embodiment 18. The system of system embodiment 17 wherein the first threshold is 95% of the total amount of training data in the training set.

System Embodiment 19. The system of system embodiments 1 or 13, wherein one or more of the inputted selector values do not produce any change in the output values (i.e., some values of the selector variables are ignored by the trained neural network).

System Embodiment 20. The system of system embodiments 1 or 13, wherein the input and output values are numerical values (e.g., floating point values between 0 and 1 or between −1 and 1).

System Embodiment 20A. The system of system embodiment 20, wherein in response to determining that an anomaly condition exists with respect to the first anomaly group classification instance said processor further controls said system to send a notification of the detection of the anomaly condition.

System Embodiment 20B. The system of system embodiment 20A, wherein said processor also controls the system to take a mitigation action in response to detection of the anomaly condition.

Apparatus Embodiment 21. A neural network for detecting traffic anomalies comprising: an input layer for receiving input values, said input values including i) a set of key performance indicator values and ii) one or more selector values corresponding to a first anomaly group classification instance (e.g., 2 selector inputs—trunk group ID, timegroup) into a trained neural network, said input values being numerical values (e.g., floating point numbers between 0 and 1 or −1 and 1); at least three neural network layers including neural network nodes, said at least three neural network layers including neural network nodes including a first neural network processing layer, a second neural network processing layer, and a bottleneck layer, said bottleneck layer having the fewest nodes of any neural network layer of the neural network containing neural network nodes, said bottleneck layer receiving inputs from said first processing neural network layer and providing outputs to said second neural network layer; an output layer which contains output values based on processing computations performed by the at least three neural network layers, said output layer being smaller than said input layer (i.e., the number of output values is less than the number of input values); and wherein said neural network having been trained to minimize the error between the computed output values and a subset of the input values.

Listing of Exemplary Numbered Non-transitory Computer Readable Medium Embodiments Non-transitory Computer Readable Medium Embodiment 1. A non-transitory computer readable medium including a first set of computer executable instructions which when executed by a processor of a traffic anomaly detection node cause the traffic anomaly detection node to: input (e.g., load) into a trained neural network input values, said input values including: i) a set of key performance indicator values and ii) one or more selector values corresponding to a first anomaly group classification instance (e.g., 2 selector inputs—trunk group ID, timegroup); operate the trained neural network to output values corresponding to the inputted set of key performance indicator values; determine a score for the first anomaly group classification instance based on the output values of the trained neural network corresponding to the key performance indicator values, each of said output values corresponding to one key performance indicator input value; compare the score to a first threshold; and when said score is above a first threshold determining that an anomaly condition exists with respect to the first anomaly group classification instance.

Non-transitory Computer Readable Medium Embodiment 2. The non-transitory computer readable medium of non-transitory computer readable medium embodiment 1, wherein said trained neural network is an autoencoder neural network trained to minimize the error between the outputted values corresponding to the inputted set of key performance indicator values, said autoencoder neural network being a neural network including: i) a number of neural network nodes in a bottleneck layer of the neural network, said bottleneck layer of the neural network having the fewest number of nodes of any layer of the neural network containing neural network nodes; ii) one or more encoding layers, each of said encoding layers containing more neural network nodes than said bottleneck layer; and iii) one or more decoding layers, each of said decoding layers containing more neural network nodes than said bottleneck layer.

Non-transitory Computer Readable Medium Embodiment 3. A non-transitory computer readable medium including a first set of computer executable instructions which when executed by a processor of a traffic anomaly detection node cause the traffic anomaly detection node to: input into a trained neural network input values, said input values including: i) a set of key performance indicator values and ii) one or more selector values corresponding to a first anomaly group classification instance (e.g., 2 selector inputs—trunk group ID, timegroup); operate the trained neural network to output values corresponding to a subset of the inputted values; determine a score for the first anomaly group classification instance based on one or more of the output values of the trained neural network, said one or more output values corresponding to one or more of the key performance indicator values included in the set of key performance indicator values; compare the score to a first threshold; and when said score is above a first threshold determine that an anomaly condition exists with respect to the first anomaly group classification instance.

Non-transitory Computer Readable Medium Embodiment 4. The non-transitory computer readable medium of non-transitory computer readable medium embodiment 3, wherein said trained neural network includes: an input layer for receiving the input values; an output layer which contains the computed output values, said output layer being smaller than said input layer (i.e., there are fewer output values than input values); at least three neural network layers including neural network nodes, said at least three neural network layers including neural network nodes including a first neural network processing layer, a second neural network processing layer, and a bottleneck layer, said bottleneck layer having the fewest nodes of any neural network layer of the neural network containing neural network nodes, said bottleneck layer receiving inputs from said first processing neural network layer and providing outputs to said second neural network layer; and wherein said neural network having been trained to minimize the error between the output values and a subset of the input values.

While various embodiments have been discussed above and in the claims below, it should be appreciated that not necessarily all embodiments include the same features and some of the features described herein are not necessary but can be desirable in some embodiments. Numerous additional features, embodiments and benefits of various embodiments are discussed in the claims which follow.

The techniques of various embodiments may be implemented using software, hardware and/or a combination of software and hardware. Various embodiments are directed to apparatus, e.g., neural networks, traffic anomaly detection systems/devices, database systems, call processing devices, session border controllers, communications devices, network nodes and/or network equipment devices. Various embodiments are also directed to methods, e.g., method of controlling and/or operating devices such as, neural networks, traffic anomaly detection systems/devices, database systems, call processing devices, session border controllers, communications devices, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., sensors, call processing devices, gateways, session border, network nodes and/or network equipment devices, including a processor configured to implement one, multiple or all of the steps of one or more methods of the invention.

In some embodiments, the processor or processors, e.g., CPUs, of one or more devices, e.g., computing nodes such as neural networks, traffic anomaly detection systems/devices, database systems, call processing devices, session border controllers, communications devices, network nodes and/or network equipment devices are configured to perform the steps of the methods described as being performed by the computing nodes, e.g., neural networks, traffic anomaly detection systems/devices systems/devices, database systems, call processing devices, session border controllers, communications devices, network nodes and/or network equipment devices. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., computing node such as neural networks, traffic anomaly detection systems/devices, database systems, call processing devices, session border controllers, communications devices, network nodes and/or network equipment devices with a processor which includes a component corresponding to each of the steps of the various described methods performed by the device in which the processor is included. In some but not all embodiments a device, e.g., computing node such as neural networks, traffic anomaly detection systems/devices, database systems, call processing devices, session border controllers, communications devices, network nodes and/or network equipment devices, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a computing device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a neural network, traffic anomaly detection systems/devices, database systems, call processing devices, session border controllers, communications devices, network nodes and/or network equipment devices described in the present application.

Numerous additional variations on the methods and apparatus of the various embodiments described above will be apparent to those skilled in the art in view of the above description. Numerous additional embodiments, within the scope of the present invention, will be apparent to those of ordinary skill in the art in view of the above description and the claims which follow. Such variations and embodiments are to be considered within the scope of the invention.

What is claimed is:

1. A method of operating a system to detect traffic anomalies comprising:
   inputting input values into a trained neural network, said input values including: i) a set of key performance indicator values and ii) one or more selector values corresponding to a first anomaly group classification instance;
   operating the trained neural network to output values corresponding to the inputted set of key performance indicator values;
   determining a score for the first anomaly group classification instance based on the output values of the trained neural network corresponding to the key performance indicator values, each of said output values corresponding to one key performance indicator input value;
   comparing the score to a first threshold; and
   when said score is above the first threshold determining that an anomaly condition exists with respect to the first anomaly group classification instance;
   wherein said neural network includes:
      an input layer which receives the input values;
      an output layer from which the neural network output values are outputted;
      a bottleneck layer including a plurality of neural network nodes, said bottleneck layer having the fewest neural network nodes of any layer in the neural network containing neural network nodes, said bottleneck layer receiving inputs from a first neural network layer containing more neural network nodes than said bottleneck layer, said bottleneck layer providing outputs to a second neural network layer containing more neural network nodes than said bottleneck layer; and
   wherein said neural network minimizes the error between the neural network output values and a subset of the input values.

2. The method of claim 1 further comprising:
   when said score is at or below said first threshold determining that an anomaly condition does not exist with respect to the first anomaly group classification instance.

3. The method of claim 2, wherein determining a score for the first anomaly group classification instance based on the output values of the trained neural network includes determining a loss function value which measures the difference between the inputted key performance indicator values and the corresponding neural network output values, said trained neural network being an autoencoder neural network.

4. The method of claim 3, wherein said score for the first anomaly group classification instance is the determined loss function value.

5. The method of claim 4,
wherein said input values inputted into the trained neural network are a set of input values; and
wherein said loss function value is a reproduction error of the autoencoder neural network post-image output indicating an amount of discrepancy between a subset of the input values and corresponding autoencoder neural network output values, said subset of the input values being smaller than the set of input values.

6. The method of claim 3, wherein said loss function value is determined using a non-standard cross-entropy loss function.

7. The method of claim 4,
wherein said first anomaly group classification instance is a trunk group during a specified time period; and
wherein said key performance indicator values are traffic performance measurements corresponding to the trunk group during the specified time period.

8. The method of claim 4,
wherein said first anomaly group classification instance is a two dimensional group classification, the first dimension group classification being a trunk group and the second dimension group classification being a time group, the trunk group specifying the identity of the trunk group from a plurality of trunk groups and the time group specifying a time period; and
wherein said key performance indicator values are traffic performance measurements for the identified trunk group during the time period specified by the time group.

9. The method of claim 8, wherein the key performance indicators include two or more of the following: ingress and egress bids, ingress and egress connections, ingress and egress minutes of usage (MOU), number of bids, connects and MOU independent of direction.

10. The method of claim 1,
wherein said first anomaly group classification instance is an N-dimensional group classification, N being a positive integer value greater than one, the N-dimensional group classification including two or more of the following: source, destination, subscriber, trunk group, and time group.

11. A method of operating a system to detect traffic anomalies comprising:
inputting input values into a trained neural network, said input values including: i) a set of key performance indicator values and ii) one or more selector values corresponding to a first anomaly group classification instance;
operating the trained neural network to output values corresponding to a subset of the inputted values;
determining a score for the first anomaly group classification instance based on one or more of the output values of the trained neural network, said one or more output values corresponding to one or more of the key performance indicator values included in the set of key performance indicator values;
comparing the score to a first threshold;
when said score is above the first threshold determining that an anomaly condition exists with respect to the first anomaly group classification instance; and
wherein said trained neural network includes:
an input layer for receiving the input values;
an output layer which contains the computed output values, said output layer being smaller than said input layer;
at least three neural network layers including neural network nodes, said at least three neural network layers including neural network nodes including a first neural network processing layer, a second neural network processing layer, and a bottleneck layer, said bottleneck layer having the fewest nodes of any neural network layer of the neural network containing neural network nodes, said bottleneck layer receiving inputs from said first processing neural network layer and providing outputs to said second neural network layer;
said neural network having been trained to minimize the error between the output values and a subset of the input values.

12. A system to detect traffic anomalies comprising:
a trained neural network; and
a processor, said processor being configured to control the operations of the system to:
input into the trained neural network input values, said input values including: i) a set of key performance indicator values and ii) one or more selector values corresponding to a first anomaly group classification instance;
operate the trained neural network to output values corresponding to the inputted set of key performance indicator values;
determine a score for the first anomaly group classification instance based on the output values of the trained neural network corresponding to the key performance indicator values, each of said output values corresponding to one key performance indicator input value;
compare the score to a first threshold; and
when said score is above the first threshold determine that an anomaly condition exists with respect to the first anomaly group classification instance;
wherein said trained neural network is an autoencoder neural network trained to minimize the error between the outputted values corresponding to the inputted set of key performance indicator values, said autoencoder neural network being a neural network including:
i) a number of neural network nodes in a bottleneck layer of the neural network, said bottleneck layer of the neural network having the fewest number of nodes of any layer of the neural network containing neural network nodes;
ii) one or more encoding layers, each of said encoding layers containing more neural network nodes than said bottleneck layer; and
iii) one or more decoding layers, each of said decoding layers containing more neural network nodes than said bottleneck layer.

13. The system of claim 12, wherein when said determined score is at or below said first threshold, said system is controlled by said processor to determine that an anomaly condition does not exist with respect to the first anomaly group classification instance.

14. The system of claim 13, wherein the operation to determine a score for the first anomaly group classification instance based on the output values of the trained autoencoder neural network includes determining a loss function value which measures the difference between the inputted key performance indicator values and the corresponding autoencoder neural network output values.

15. The system of claim 14, wherein said score for the first anomaly group classification instance is the determined loss function value.

16. The system of claim 15,
wherein said input values inputted into the trained neural network are a set of input values; and
wherein said loss function value is a reproduction error of the autoencoder neural network post-image output indicating an amount of discrepancy between a subset of the input values and corresponding autoencoder neural network output values, said subset of the input values being smaller than the set of input values.

17. The system of claim 12,
wherein said first anomaly group classification instance is an N-dimensional group classification, N being a positive integer value greater than 1, the N dimensional group classification including a time group classification and one or more of the following dimension group classifications: source, destination, subscriber, trunk group, the first anomaly group classification specifying the identity of the instance of the one or more group types from a plurality of such instances; and
wherein said key performance indicator values are traffic performance measurements or metrics for the identified one or more group classification instances during the time period specified by the time group.

18. The method of claim 1 further comprising:
in response to determining an anomaly condition exists taking a mitigation action to reduce the effect of the anomaly.

19. The method of claim 1 further comprising:
prior to inputting the input values into the trained neural network, training the neural network with a training dataset of unlabeled Key Performance Indicator data, and
wherein the unlabeled Key Performance Indicator training data of the training dataset does not include an indication of which Key Performance Indicator training data of the training dataset is good and which is bad.

20. The system of claim 12, wherein the processor is further configured to control the operation of the system to take a mitigation action to reduce the effect of an anomaly upon determining that an anomaly condition exists.

21. The system of claim 12,
wherein the neural network is trained with a training dataset of unlabeled Key Performance Indictor data; and
wherein the unlabeled Key Performance Indicator data of the training dataset does not include an indication of which Key Performance Indicator data of the training dataset is good and which is bad.

22. A non-transitory computer readable medium including a first set of computer executable instructions which when executed by a processor of a traffic anomaly detection node cause the traffic anomaly detection node to:
input into a trained neural network input values, said input values including: i) a set of key performance indicator values and ii) one or more selector values corresponding to a first anomaly group classification instance;
operate the trained neural network to output values corresponding to the inputted set of key performance indicator values;
determine a score for the first anomaly group classification instance based on the output values of the trained neural network corresponding to the key performance indicator values, each of said output values corresponding to one key performance indicator input value;
compare the score to a first threshold;
when said score is above the first threshold determining that an anomaly condition exists with respect to the first anomaly group classification instance; and
wherein said trained neural network is an autoencoder neural network trained to minimize the error between the outputted values corresponding to the inputted set of key performance indicator values, said autoencoder neural network being a neural network including:
i) a number of neural network nodes in a bottleneck layer of the neural network, said bottleneck layer of the neural network having the fewest number of nodes of any layer of the neural network containing neural network nodes;
ii) one or more encoding layers, each of said encoding layers containing more neural network nodes than said bottleneck layer; and
iii) one or more decoding layers, each of said decoding layers containing more neural network nodes than said bottleneck layer.

* * * * *